United States Patent
Amano

(10) Patent No.: US 12,222,481 B2
(45) Date of Patent: Feb. 11, 2025

(54) ZOOM LENS, PROJECTION TYPE DISPLAY DEVICE, AND IMAGING APPARATUS

(71) Applicant: FUJIFILM Corporation, Tokyo (JP)

(72) Inventor: Masaru Amano, Saitama (JP)

(73) Assignee: FUJIFILM Corporation, Tokyo (JP)

(*) Notice: Subject to any disclaimer, the term of this patent is extended or adjusted under 35 U.S.C. 154(b) by 310 days.

(21) Appl. No.: 17/653,783

(22) Filed: Mar. 7, 2022

(65) Prior Publication Data
US 2022/0308325 A1    Sep. 29, 2022

(30) Foreign Application Priority Data

Mar. 24, 2021 (JP) ................................ 2021-050782

(51) Int. Cl.
G02B 15/177    (2006.01)
G02B 13/16    (2006.01)
G02B 15/14    (2006.01)

(52) U.S. Cl.
CPC ........... *G02B 15/177* (2013.01); *G02B 13/16* (2013.01); *G02B 15/1461* (2019.08)

(58) Field of Classification Search
CPC ................ G02B 13/16; G02B 15/1461; G02B 27/0012; G02B 15/145127; G02B 15/167; G02B 7/04; G02B 7/10; G02B 13/02; G02B 15/14
See application file for complete search history.

(56) References Cited

U.S. PATENT DOCUMENTS

| 2015/0268453 A1 | 9/2015 | Oe et al. |
| 2017/0153427 A1 | 6/2017 | Masui |
| 2018/0157011 A1 | 6/2018 | Oe et al. |
| 2018/0341092 A1* | 11/2018 | Machida ............ G02B 15/1461 |
| 2019/0155004 A1 | 5/2019 | Amano |
| 2019/0306390 A1* | 10/2019 | Nagatoshi ............ G03B 21/142 |
| 2020/0233191 A1* | 7/2020 | Ichimura ................ G02B 13/18 |

FOREIGN PATENT DOCUMENTS

| JP | 2015-179270 A | 10/2015 |
| JP | 2017-102239 A | 6/2017 |
| JP | 2019-095789 A | 6/2019 |
| JP | 2019-174633 A | 10/2019 |
| WO | WO-2018150981 A1 * | 8/2018 ............. G02B 13/16 |

OTHER PUBLICATIONS

An Office Action mailed by the Japanese Patent Office on Aug. 6, 2024, which corresponds to Japanese Patent Application No. 2021-050782 and is related to U.S. Appl. No. 17/653,783; with English language translation.

* cited by examiner

*Primary Examiner* — Marin Pichler
*Assistant Examiner* — Mackenzi Waddell
(74) *Attorney, Agent, or Firm* — Studebaker & Brackett PC

(57) ABSTRACT

The zoom lens consists of a first optical system including a lens at a position closest to the magnification side and a second optical system forming an intermediate image in order from the magnification side. The first optical system reforms the intermediate image on a magnification side imaging plane. The second optical system includes a lens group including an aperture stop, having a negative refractive power, and moving during zooming. The zoom lens satisfies a conditional expression: $0.1 < f2w/fAp < 2.1$, where fAp is a focal length of the lens group having the aperture stop and f2w is a focal length of the second optical system at a wide angle end.

18 Claims, 10 Drawing Sheets

EXAMPLE 1

EXAMPLE 3

ZOOM LENS, PROJECTION TYPE DISPLAY DEVICE, AND IMAGING APPARATUS

CROSS-REFERENCE TO RELATED APPLICATIONS

The present application claims priority under 35 U.S.C. § 119 to Japanese Patent Application No. 2021-050782, filed on Mar. 24, 2021. The above application is hereby expressly incorporated by reference, in its entirety, into the present application.

BACKGROUND

Technical Field

The technique of the present disclosure relates to a zoom lens, a projection type display device, and an imaging apparatus.

Related Art

As a zoom lens applicable to a projection type display device or an imaging apparatus, for example, the lens systems described in JP2017-102239A, JP2015-179270A, and JP2019-095789A below are known.

In recent years, there has been a demand for a zoom lens as a system that forms an intermediate image, the zoom lens having a wide angle, a high magnification, and high performance while suppressing fluctuations in the F number during zooming.

SUMMARY

The present disclosure has been made in view of the above-mentioned circumstances, and it is an object of the present invention to provide a zoom lens as a system that forms an intermediate image, the zoom lens having a wide angle, a high magnification, and high performance while suppressing fluctuations in the F number during zooming, a projection type display device comprising the zoom lens, and an imaging apparatus comprising the zoom lens.

According to one aspect of the technique of the present disclosure, the zoom lens consists of a first optical system and a second optical system in order from a magnification side to a reduction side along an optical path. The second optical system forms an intermediate image at a position conjugate to a reduction side imaging plane, the first optical system reforms the intermediate image on a magnification side imaging plane, the zoom lens includes a lens at a position closest to the magnification side on the optical path of the first optical system, in a case where one lens group is a group of which a distance to an adjacent group in an optical axis direction changes during zooming, the second optical system includes a plurality of lens groups that move during zooming, one of the plurality of lens groups that move during zooming is a lens group having an aperture stop that determines a numerical aperture, and the lens group having the aperture stop has a negative refractive power. Assuming that a focal length of the lens group having the aperture stop is fAp and a focal length of the second optical system at a wide angle end is f2w, Conditional Expression (1) is satisfied.

$$0.1 < f2w/fAp < 2.1 \quad (1)$$

It is preferable that the zoom lens of the above-mentioned aspect satisfies Conditional Expression (1-1).

$$0.2 < f2w/fAp < 1.8 \quad (1\text{-}1)$$

In the zoom lens of the above-mentioned aspect, assuming that a difference in the optical axis direction between a position of the lens group having the aperture stop at the wide angle end and a position of the lens group having the aperture stop at a telephoto end is ZAp and a focal length of the zoom lens at the wide angle end is fw, it is preferable that Conditional Expression (2) is satisfied, and it is more preferable that Conditional Expression (2-1) is satisfied.

$$4 < ZAp/|fw| < 10 \quad (2)$$

$$4.7 < ZAp/|fw| < 8 \quad (2\text{-}1)$$

In the zoom lens of the above-mentioned aspect, assuming that an average of Abbe numbers of all positive lenses included in the lens group having the aperture stop based on a d line is νAp, it is preferable that Conditional Expression (3) is satisfied, and it is more preferable that Conditional Expression (3-1) is satisfied.

$$65 < νAp \quad (3)$$

$$70 < νAp < 90 \quad (3\text{-}1)$$

It is preferable that during zooming, an opening diameter of the aperture stop is variable, and the numerical aperture of the zoom lens is constant throughout an entire zoom range.

In the zoom lens of the above-mentioned aspect, assuming that a focal length of the zoom lens at the wide angle end is fw and a focal length of the second optical system at the wide angle end is f2w, it is preferable that Conditional Expression (4) is satisfied, and it is more preferable that Conditional Expression (4-1) is satisfied.

$$-0.1 < |fw|/f2w < 0 \quad (4)$$

$$-0.06 < |fw|/f2w < 0 \quad (4\text{-}1)$$

In the zoom lens of the above-mentioned aspect, assuming that a focal length of a lens group having an aperture stop is fAp and a focal length of the lens group, which is disposed adjacent to the lens group having the aperture stop on the reduction side of the lens group having the aperture stop and moves during zooming, is fR, it is preferable that Conditional Expression (5) is satisfied, and it is more preferable that Conditional Expression (5-1) is satisfied.

$$-1.2 < fR/fAp < -0.1 \quad (5)$$

$$-1 < fR/fAp < -0.2 \quad (5\text{-}1)$$

In the zoom lens of the above-mentioned aspect, assuming that a back focal length of the zoom lens on the reduction side at the wide angle end at an air conversion distance is Bfw and a focal length of the zoom lens at the wide angle end is fw, it is preferable that Conditional Expression (6) is satisfied, and it is more preferable that Conditional Expression (6-1) is satisfied.

$$4 < Bfw/|fw| \quad (6)$$

$$5 < Bfw/|fw| < 10 \quad (6\text{-}1)$$

It is preferable that the zoom lens of the above-mentioned aspect consists of six lens groups. It is preferable that a lens group closest to the magnification side in the zoom lens has a positive refractive power and remains stationary with respect to the reduction side imaging plane during zooming, and a lens group closest to the reduction side in the zoom lens has a positive refractive power and remains stationary with respect to the reduction side imaging plane during zooming.

It is preferable that the second optical system includes, successively in order from a position closest to the reduction side to the magnification side along the optical path, a second A lens group that has a positive refractive power, a second B lens group that has a positive refractive power, a second C lens group that has a negative refractive power, a second D lens group that has a positive refractive power, and a second E lens group that has a refractive power, and during zooming, the second B lens group, the second C lens group, the second D lens group, and the second E lens group move along an optical axis by changing the distances between the adjacent groups in the optical axis direction, and the second A lens group remains stationary with respect to the reduction side imaging plane.

It is preferable that the first optical system includes a plurality of focus groups on the optical path on the reduction side of a maximum air spacing of the first optical system at the wide angle end, and the plurality of focus groups perform focusing by changing distances between the focus groups in the optical axis direction.

According to another aspect of the technique of the present disclosure, there is provided a projection type display device comprising: a light valve that outputs an optical image; and the zoom lens according to the above-mentioned aspect, in which the zoom lens projects the optical image, which is output from the light valve, onto a screen.

According to still another aspect of the technique of the present disclosure, there is provided an imaging apparatus comprising the zoom lens according to the above-mentioned aspect.

In the present specification, it should be noted that the terms "consisting of ~" and "consists of ~" mean that the lens may include not only the above-mentioned components but also lenses substantially having no refractive powers, optical elements, which are not lenses, such as a stop, a mask, a filter, a cover glass, a plane mirror, and a prism, and mechanism parts such as a lens flange, a lens barrel, an imaging element, and a camera shaking correction mechanism. Further, the "lens group" may include optical elements other than the lens such as a stop, a mask, a filter, a cover glass, a plane mirror, and a prism in addition to the lens.

In the present specification, the terms "~group that has a positive refractive power" and "~group that has a positive refractive power" mean that the group as a whole has a positive refractive power. Similarly, the terms "~group that has a negative refractive power" and "~group has a negative refractive power" mean that the group as a whole has a negative refractive power. The sign of the refractive power, the curvature radius, and the surface shape of the lens including the aspherical surface will be used in terms of the paraxial region unless otherwise specified.

The values used in conditional expressions are values in a case where the d line is set as a reference. The "d line", "C line", and "F line" described in the present specification are bright lines, the wavelength of the d line is 587.56 nm (nanometers), the wavelength of the C line is 656.27 nm (nanometers), and the wavelength of the F line is 486.13 nm (nanometers).

According to the technique of the present disclosure, it is possible to provide a zoom lens as a system that forms an intermediate image, the zoom lens having a wide angle, a high magnification, and high performance while suppressing fluctuations in the F number during zooming, a projection type display device comprising the zoom lens, and an imaging apparatus comprising the zoom lens.

DESCRIPTION OF EMBODIMENTS

Figure 1:
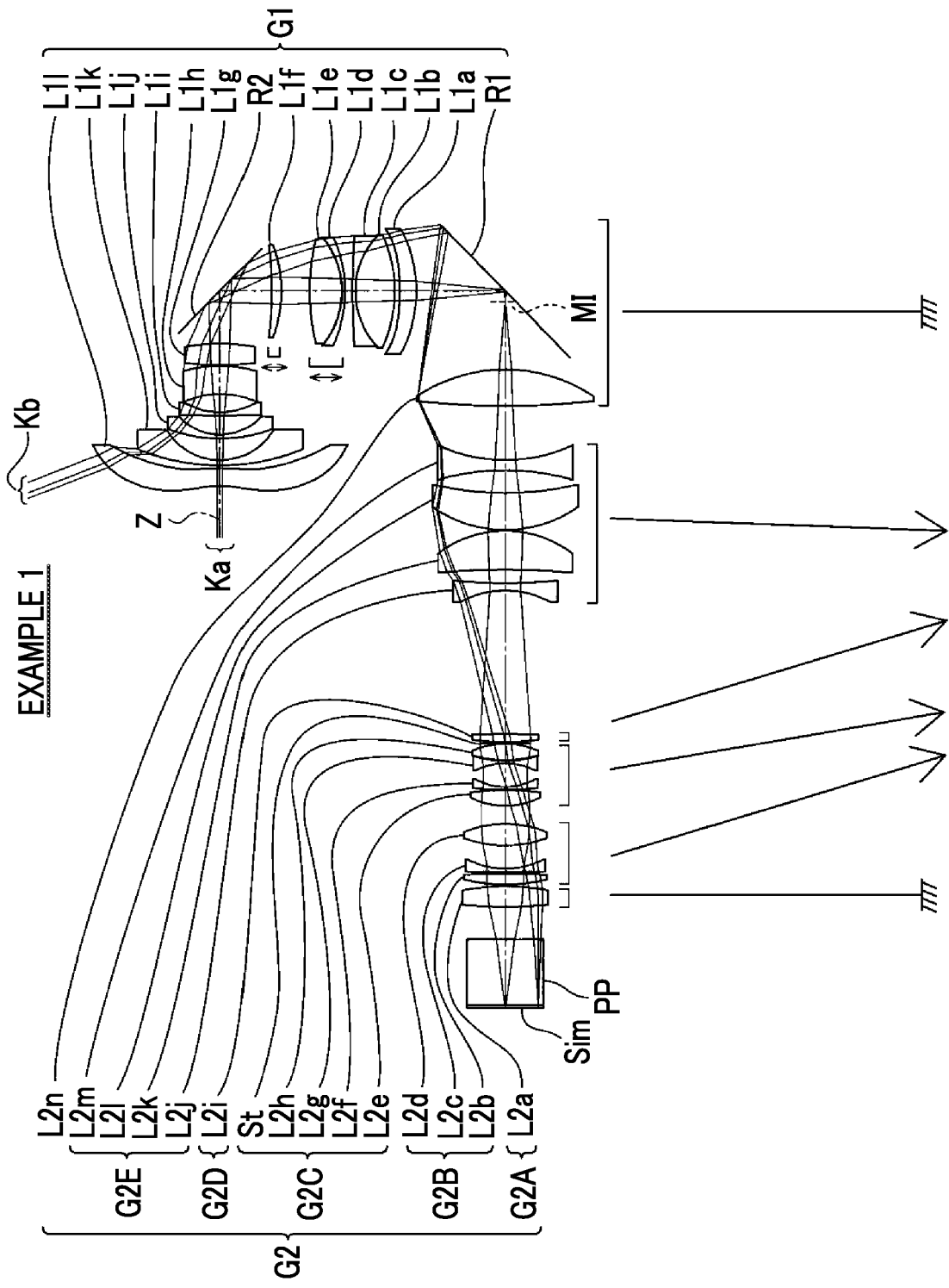
FIG. 1 is a cross-sectional view showing a configuration and a luminous flux of a zoom lens according to an example of an embodiment of the present disclosure, corresponding to a zoom lens of Example 1.

Hereinafter, an example of an embodiment according to the technique of the present disclosure will be described in detail with reference to the drawings. FIG. 1 shows a configuration of a zoom lens according to an embodiment of the present disclosure in a cross section including an optical axis Z at a wide angle end. The configuration example shown in FIG. 1 corresponds to Example 1 described later. FIG. 1 also shows an on-axis luminous flux Ka and a luminous flux with the maximum angle of view Kb.

The zoom lens of the present embodiment may be a projection optical system mounted on a projection type display device, or may be an imaging optical system mounted on an imaging apparatus or the like. Hereinafter, the case of using the zoom lens in the application of the projection optical system will be described.

FIG. 1 shows an example in which an optical member PP is disposed on the reduction side of the zoom lens, under the assumption that the zoom lens is mounted on a projection type display device. The optical member PP is a member which is regarded as a filter, a cover glass, a color synthesis prism, or the like. The optical member PP has no refractive power, and the optical member PP may be configured to be omitted.

Further, FIG. 1 also shows an image display surface Sim of the light valve under the assumption that the zoom lens is mounted on the projection type display device. In the projection type display device, luminous flux provided with image information on the image display surface Sim are incident on the zoom lens through the optical member PP, and are projected onto the screen, which is not shown, through the zoom lens. In such a case, the image display surface Sim corresponds to the reduction side imaging plane, and the screen corresponds to the magnification side imaging plane.

In the description of the present specification, the term "magnification side" means the screen side on the optical path, and the "reduction side" means the image display surface Sim side on the optical path. In the following description, in order to avoid making the description redundant, the phrase "in order from the magnification side to the reduction side along the optical path" may be described as "in order from the magnification side to the reduction side". Similarly, the phrase "in order from the reduction side to the magnification side along the optical path" may be described as "in order from the reduction side to the magnification side".

As shown in FIG. 1, the zoom lens of the present embodiment consists of a first optical system G1 and a second optical system G2 in order from the magnification side to the reduction side along the optical path. The second optical system G2 forms an intermediate image MI at a position conjugate to the reduction side imaging plane. The first optical system G1 reforms the intermediate image MI on the magnification side imaging plane. In the example of FIG. 1, the intermediate image MI is formed on the optical path between the first optical system G1 and the second optical system G2. The intermediate image MI in FIG. 1 does not indicate an accurate shape since only a part thereof in the vicinity of the optical axis Z is schematically indicated by a simple dotted line in order to show a position on the optical axis Z.

In the projection type display device, the second optical system G2 forms an intermediate image MI of an image displayed on the image display surface Sim, and the first optical system G1 projects the intermediate image MI onto the screen to form a projected image. As described above, in the optical system using a method of forming the intermediate image MI, a back focal length of the first optical system G1 can be reduced, a lens diameter of the first optical system G1 on the magnification side can be reduced, and a focal length of the whole system can be reduced to form a configuration suitable for achieving an increase in angle of view.

For example, the first optical system G1 in FIG. 1 consists of mirrors R1, lenses L1a to L1f, mirrors R2, and lenses L1g to L1l in order from the reduction side to the magnification side. The mirror R1 and the mirror R2 are optical path deflection members that deflect the optical path by 90 degrees.

As shown in FIG. 1, the zoom lens of the present embodiment includes a lens at a position closest to the magnification side on the optical path of the first optical system G1. Unlike the present embodiment, in a projection optical system including a reflective member such as a mirror at a position closest to the magnification side, a luminous flux near the optical axis Z cannot reach the screen and thus cannot be used for imaging, but in the present embodiment, such a problem can be avoided.

For example, the second optical system G2 of FIG. 1 consists of lenses L2a to L2h, an aperture stop St, and lenses L2i to L2n in order from the reduction side to the magnification side. The lens L2a constitutes a second A lens group G2A. The lenses L2b to L2d constitute a second B lens group G2B. The lenses L2e to L2h and the aperture stop St constitute a second C lens group G2C. The lens L2i constitutes a second D lens group G2D. The lenses L2j to L2m constitute a second E lens group G2E. In the technique of the present disclosure, one lens group is a group of which a distance to an adjacent group in a direction of the optical axis Z changes during zooming. The lens group is not limited to a configuration in which the lens group consists of a plurality of lenses, but the lens group may consist of only one lens.

As shown in FIG. 1, the second optical system G2 includes a plurality of lens groups that move during zooming. According to this configuration, the zooming can be performed only by the second optical system G2. Therefore, the zooming can be performed by changing the relay magnification of the second optical system G2, that is, changing the size of the intermediate image MI. Thereby, it is possible to simplify the configuration of the optical system. Further, by using a lens of the second optical system G2, which is easier to be reduced in diameter than the first optical system G1, as the lens that moves during zooming, a load on the drive system can be reduced and a size of the device can be reduced.

For example, in the example of FIG. 1, among the lens groups of the second optical system G2, the second B lens group G2B, the second C lens group G2C, the second D lens group G2D, and the second E lens group G2E move by changing the distances between the adjacent groups in the direction of the optical axis Z during zooming.

One of the plurality of lens groups that move during zooming of the second optical system G2 is configured to be a lens group having an aperture stop St that determines the numerical aperture. By making the lens group, which determines the numerical aperture of the lens system, a group that moves during zooming, it is easy to miniaturize the whole system. Hereinafter, for convenience of explanation, a lens group that has an aperture stop St of the second optical system G2 will be referred to as an Ap lens group. In the example of FIG. 1, the second C lens group G2C corresponds to the Ap lens group.

The Ap lens group is configured to be a lens group that has a negative refractive power. In general, in a case where a zoom magnification is large, an amount of movement of each lens group is large. Therefore, balance of each aberration such as spherical aberration and field curvature at the wide angle end and the telephoto end tends to be significantly deteriorated. On the other hand, the Ap lens group including the lens optically disposed in the vicinity of the aperture stop St is a lens group that has a great effect in correcting a field curvature on the wide angle side, particularly a field curvature on the sagittal image plane. In a case of balancing the field curvature in a range including the telephoto side, by giving the Ap lens group a negative refractive power, it is possible to exert an effect as a lens group with a large correction effect in the range including the telephoto side. Therefore, deterioration in aberration balance between the wide angle end and the telephoto end can be further reduced. From the above-mentioned circumstances, by giving the Ap lens group a negative refractive power, it is easy to suppress fluctuation in aberration accompanying an increase in magnification. In a case where the Ap lens group has a negative refractive power and the zoom lens satisfies Conditional Expression (1) described below, it is easy to achieve both an increase in magnification and aberration correction while suppressing fluctuation in F number during zooming.

Assuming that a focal length of the Ap lens group is fAp and a focal length of the second optical system G2 at the wide angle end is f2w, it is preferable that the zoom lens satisfies Conditional Expression (1). In general, in a case where the lens group that has the aperture stop St moves during zooming, the F number tends to fluctuate due to zooming. Conditional Expression (1) is a conditional expression for increasing the magnification while suppressing fluctuation in F number due to the zooming. By not allowing the corresponding value of Conditional Expression (1) to be equal to or less than the lower limit, the refractive power of the Ap lens group is prevented from becoming excessively weak in the second optical system G2. Therefore, the amount of movement during zooming of the Ap lens group can be suppressed. As a result, an increase in total lens length can be suppressed, and fluctuation in F number during zooming from the wide angle end to the telephoto end can be suppressed. By not allowing the corresponding value of Conditional Expression (1) to be equal to or greater than the upper limit, the refractive power of the Ap lens group is prevented from becoming excessively strong in the second optical system G2. Therefore, it is possible to suppress fluctuations in various aberrations such as spherical aberration and longitudinal chromatic aberration due to zooming. As a result, there is an advantage in achieving an increasing in magnification. In order to obtain more favorable characteristics, it is more preferable that the zoom lens satisfies Conditional Expression (1-1).

$$0.1 < f2w/fAp < 2.1 \quad (1)$$

$$0.2 < f2w/fAp < 1.8 \quad (1\text{-}1)$$

Assuming that a difference in the direction of the optical axis Z between the position of the Ap lens group at the wide angle end and the position of the Ap lens group at the telephoto end is ZAp, and a focal length of the zoom lens at the wide angle end is fw, it is preferable that the zoom lens satisfies Conditional Expression (2). By not allowing the corresponding value of Conditional Expression (2) to be equal to or less than the lower limit, it is easy to achieve an increase in magnification. By not allowing the corresponding value of Conditional Expression (2) to be equal to or greater than the upper limit, the amount of movement of the Ap lens group during zooming can be suppressed. Therefore, fluctuation in F number during zooming can be suppressed. In order to obtain more favorable characteristics, it is more preferable that the zoom lens satisfies Conditional Expression (2-1).

$$4 < ZAp/|fw| < 10 \quad (2)$$

$$4.7 < ZAp/|fw| < 8 \quad (2\text{-}1)$$

Assuming that an average of Abbe numbers of all the positive lenses included in the Ap lens group based on the d line is νAp, it is preferable that the zoom lens satisfies Conditional Expression (3). By not allowing the corresponding value of Conditional Expression (3) to be equal to or less than the lower limit, it is easy to correct longitudinal chromatic aberration. In order to obtain more favorable characteristics, it is more preferable that the zoom lens satisfies Conditional Expression (3-1). By not allowing the corresponding value of Conditional Expression (3-1) to be equal to or greater than the upper limit, the price of the lens material can be suppressed. As a result, there is an advantage in cost reduction.

$$65 < \nu Ap \quad (3)$$

$$70 < \nu Ap < 90 \quad (3\text{-}1)$$

It is preferable that, during zooming, an opening diameter of the aperture stop St included in the Ap lens group is variable, and a numerical aperture of the zoom lens is constant throughout the entire zoom range. That is, it is preferable that the aperture stop St is a variable stop capable of changing the opening diameter during zooming such that the numerical aperture of the zoom lens is constant throughout the entire zoom range. By using such a variable stop, it is possible to prevent an increase in F number during zooming from the wide angle end to the telephoto end. Therefore, a decrease in brightness at the telephoto end can be suppressed.

Assuming that a focal length of the zoom lens at the wide angle end is fw and a focal length of the second optical system G2 at the wide angle end is f2w, it is preferable that the zoom lens satisfies Conditional Expression (4). By not allowing the corresponding value of Conditional Expression (4) to be equal to or less than the lower limit, the negative refractive power of the second optical system G2 is prevented from becoming excessively strong, and the positive refractive power of the first optical system G1 is also prevented from becoming excessively strong. Therefore, it is possible to suppress an increase in angle of the off-axis principal ray traveling from the first optical system G1 to the second optical system G2 with respect to the optical axis Z. As a result, it is possible to suppress an increase in diameter of the lens on the magnification side in the second optical system G2. As a result, there is an advantage in correcting field curvature. By not allowing the corresponding value of Conditional Expression (4) to be equal to or greater than the upper limit, the negative refractive power of the second optical system G2 can be ensured. Therefore, it is possible to suppress an increase in diameter of the lens on the reduction side in the first optical system G1. In order to obtain more favorable characteristics, it is more preferable that the zoom lens satisfies Conditional Expression (4-1).

$$-0.1 < |fw|/f2w < 0 \quad (4)$$

$$-0.06 < |fw|/f2w < 0 \quad (4\text{-}1)$$

In a case where a lens group that moves during zooming is disposed adjacent to the Ap lens group in the optical path on the reduction side of the Ap lens group, it is preferable that the zoom lens satisfies Conditional Expression (5). Hereinafter, for convenience of explanation, a lens group that is disposed adjacent to the Ap lens group in the optical path on the reduction side of the Ap lens group and moves during zooming will be referred to as an R lens group. In the example of FIG. 1, the second B lens group G2B corresponds to the R lens group. In Conditional Expression (5), a focal length of the Ap lens group is fAp, and a focal length of the R lens group is fR. By not allowing the corresponding value of Conditional Expression (5) to be equal to or less than the lower limit, the absolute value of the relative refractive power of the R lens group with respect to the Ap lens group is prevented from becoming excessively small. Therefore, an increase in total lens length can be suppressed. By not allowing the corresponding value of Conditional Expression (5) to be equal to or greater than the upper limit, the absolute value of the relative refractive power of the R lens group with respect to the Ap lens group is prevented from becoming excessively large. There is an advantage in correcting various aberrations, particularly, astigmatism during zooming. In order to obtain more favorable characteristics, it is more preferable that the zoom lens satisfies Conditional Expression (5-1).

$$-1.2 < fR/fAp < -0.1 \quad (5)$$

$$-1 < fR/fAp < -0.2 \quad (5\text{-}1)$$

Assuming that a back focal length of the zoom lens on the reduction side at the wide angle end at air conversion distance is Bfw and a focal length of the zoom lens at the wide angle end is fw, it is preferable that the zoom lens satisfies Conditional Expression (6). Bfw is an air conversion distance on the optical axis Z from the lens surface closest to the reduction side in the zoom lens to the reduction side imaging plane at the wide angle end. By not allowing the corresponding value of Conditional Expression (6) to be equal to or less than the lower limit, it is possible to ensure an appropriate back focal length. Therefore, it is easy for a color synthesis prism or the like to be disposed. By not allowing the corresponding value of Conditional Expression (6) to be equal to or greater than the upper limit, it is possible to suppress an increase in size of the whole system including the back focal length. In order to obtain more favorable characteristics, it is more preferable that the zoom lens satisfies Conditional Expression (6-1).

$$4<Bfw/|fw| \qquad (6)$$

$$5<Bfw/|fw|<10 \qquad (6\text{-}1)$$

It is preferable that the first optical system G1 includes a plurality of focus groups on the optical path on the reduction side of a maximum air spacing of the first optical system G1 at the wide angle end, and the plurality of focus groups perform focusing by changing distances between the focus groups in the direction of the optical axis Z. By moving a plurality of focus groups during focusing, it is easy to suppress fluctuation in aberrations during focusing. For example, the zoom lens of FIG. 1 includes two focus groups. In the example of FIG. 1, the first focus group consists of the lens L1$d$ and the lens L1$e$, and the second focus group consists of the lens L1$f$. In FIG. 1, double-headed arrows are shown on the left side of each focus group.

As shown in FIG. 1, it is preferable that the second optical system G2 includes, successively in order from a position closest to the reduction side to the magnification side along the optical path, a second A lens group G2A having a positive refractive power, a second B lens group G2B having a positive refractive power, a second C lens group G2C having a negative refractive power, a second D lens group G2D having a positive refractive power, and a second E lens group G2E having a refractive power. Then, it is preferable that, during zooming, the second B lens group G2B, the second C lens group G2C, the second D lens group G2D, and the second E lens group G2E move along the axis Z by changing the distances between the adjacent groups in the direction of the optical axis Z, and the second A lens group G2A remains stationary with respect to the reduction side imaging plane. The second E lens group G2E may be a lens group that has a positive refractive power or a lens group that has a negative refractive power.

By adopting a configuration the second optical system G2 as described above, each group can exert the following effects. That is, the second A lens group G2A is able to easily reduce fluctuation in aberration during zooming while maintaining the telecentricity on the reduction side. The second B lens group G2B, the second C lens group G2C, and the second D lens group G2D are able to perform a main zooming function. The second E lens group G2E can contribute to the correction of the position of the imaging plane.

In FIG. 1, below each lens group that moves during zooming, an arrow indicates an approximate direction of movement during zooming from the wide angle end to the telephoto end, and below each lens group that remains stationary during zooming, a grounding symbol is shown. Since the first optical system G1 and the lens L2$n$ in the example of FIG. 1 remain stationary with respect to the reduction side imaging plane during zooming, in FIG. 1, the first optical system G1 and the lens L2$n$ are collectively shown in a parenthesis, and a grounding symbol is shown below the parenthesis.

It is preferable that the zoom lens consists of six lens groups. It is preferable that the lens group closest to the magnification side in the zoom lens has a positive refractive power and remains stationary with respect to the imaging plane on the reduction side during zooming. It is preferable that the lens group closest to the reduction side in the zoom lens has a positive refractive power and remains stationary with respect to the reduction side imaging plane during zooming. Since the lens group closest to the magnification side remains stationary during zooming, it is possible to obtain a lens configuration in which the total lens length does not fluctuate even during zooming. Since the lens group closest to the reduction side remains stationary during zooming, it is easy to reduce fluctuation in aberration during zooming while maintaining the telecentricity on the reduction side. In the example of FIG. 1, the lens group closest to the magnification side in the zoom lens consists of the first optical system G1 and the lens L2$n$, and the lens group closest to the reduction side in the zoom lens is the second A lens group G2A.

The above-mentioned configuration and the example shown in FIG. 1 are an example of the zoom lens of the present disclosure. The number of lenses included in the first optical system G1 and the second optical system G2 of the zoom lens of the present disclosure and the number of lenses included in each lens group of the second optical system G2 are different from the number of lenses in the example shown in FIG. 1.

The above-mentioned preferred configurations and available configurations including the configurations relating to Conditional Expressions may be any combination, and it is preferable to appropriately selectively adopt the configurations in accordance with required specification. It should be noted that the ranges of the possible conditional expressions are not limited to Conditional Expressions described in the form of the expression, and the lower limit and the upper limit are selected from each of the preferable and more preferable conditional expressions. The ranges of Conditional Expressions include ranges obtained through optional combinations.

For example, a preferred aspect of the zoom lens of the present disclosure consists of, in order from a magnification side to a reduction side along an optical path, a first optical system G1 and a second optical system G2. The second optical system G2 forms an intermediate image MI at a position conjugate to a reduction side imaging plane, and the first optical system G1 reforms the intermediate image MI on a magnification side imaging plane. The first optical system G1 includes a lens at a position closest to the magnification side thereof on the optical path, in a case where one lens group is a group of which a distance to an adjacent group in a direction of the optical axis Z changes during zooming. The second optical system G2 includes a plurality of lens groups that move during zooming, one of the plurality of lens groups that move during zooming is a lens group having an aperture stop St that determines a numerical aperture, the lens group having the aperture stop St has a negative refractive power. The zoom lens satisfies Conditional Expression (1).

Next, an example of the zoom lens according to the technique of the present disclosure will be described. The reference numerals noted in the cross-sectional views of each example are used independently for each example in order to avoid complication of description and drawings due

Example 1

FIG. 1 shows a cross-sectional view of a lens configuration and luminous flux of the zoom lens according to Example 1. The configuration and the illustration method are as described above, and some redundant parts thereof will not be described. The zoom lens of Example 1 consists of a first optical system G1 and a second optical system G2 in order from the magnification side to the reduction side. An intermediate image MI is formed on the optical path between the first optical system G1 and the second optical system G2.

The first optical system G1 consists of mirrors R1, lenses L1a to L1f, mirrors R2, and lenses L1g to L1l in order from the reduction side to the magnification side. The second optical system G2 consists of a second A lens group G2A, a second B lens group G2B, a second C lens group G2C, a second D lens group G2D, a second E lens group G2E, and a lens L2n in order from the reduction side to the magnification side. The second A lens group G2A consists of a lens L2a. The second B lens group G2B consists of lenses L2b to L2d. The second C lens group G2C consists of lenses L2e to L2h and an aperture stop St. The second D lens group G2D consists of a lens L2i. The second E lens group G2E consists of lenses L2j to L2m.

Then, during zooming, the second B lens group G2B, the second C lens group G2C, the second D lens group G2D, and the second E lens group G2E move along the axis Z by changing the distances between the adjacent groups in the direction of the optical axis Z, and the second A lens group G2A, the lens L2n, and the first optical system G1 remain stationary with respect to the reduction side imaging plane. The zoom lens of Example 1 consists of six lens groups.

The zoom lens of Example 1 has two focus groups. The first focus group consists of a cemented lens in which the lens L1d and the lens L1e are cemented. The second focus group consists of a single lens of lens L1f. During focusing, the first focus group and the second focus group move by changing the mutual distance in the direction of the optical axis Z.

Regarding the zoom lens 1 of Example 1, Tables 1A and 1B show basic lens data, Table 2 shows specifications and variable surface spacings, and Table 3 shows aspherical coefficients thereof. Here, the basic lens data is shown to be divided into two tables, Table 1A and Table 1B, in order to avoid lengthening of one table. Table 1A shows the first optical system G1, and Table 1B shows the second optical system G2 and the optical member PP. In the basic lens data, the description of the mirror R1 and the mirror R2 is not repeated.

Tables 1A and 1B are described as follows. The column of Sn shows surface numbers in a case where the surface closest to the magnification side is the first surface and the number is increased one by one toward the reduction side. The column of R shows a curvature radius of each surface. The column of D shows a surface spacing between each surface and the surface adjacent to the reduction side on the optical axis Z. The column of Nd shows a refractive index of each component at the d line. The column of vd shows an Abbe number of each component based on the d line.

In Tables 1A and 1B, signs of curvature radii of surface shapes convex toward the magnification side are set to be positive, and signs of curvature radii of surface shapes convex toward the reduction side are set to be negative. In Table 1B, in a cell of a surface number of a surface corresponding to the aperture stop St, the surface number and a term of (St) are noted. A value at the bottom cell of D in Table 1B indicates a distance between the image display surface Sim and the surface closest to the reduction side in the table. In Table 1B, the symbol DD[ ] is used for each variable surface spacing during zooming, and the magnification side surface number of the distance is given in [ ] and is noted in the column of D.

In Table 2, regarding the zoom lens, the zoom magnification Zr, the absolute value of the focal length |f|, the F number FNo., the maximum total angle of view of 2ω, and the variable surface spacing during zooming are shown based on the d line.)(° in the cell of 2ω indicates that the unit thereof is a degree. In Table 2, values in the wide angle end state, the intermediate focal length state, and the telephoto end state are shown in the WIDE, MIDDLE, and TELE columns, respectively.

In basic lens data, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am (m=3, 4, 5, . . . 20) show numerical values of the aspherical coefficients for each aspherical surface. The "E±n" (n: an integer) in numerical values of the aspherical coefficients of Table 3 indicates "×10$^{\pm n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is a reciprocal of the paraxial curvature radius, KA and Am are aspherical coefficients, and Σ in the aspherical surface expression means the sum with respect to m.

All the following tables and the aberration diagrams described later are data in a case where an absolute value of the focal length of the zoom lens is standardized to be 1.0. Each of the following tables shows numerical values rounded off to predetermined decimal places.

TABLE 1A

Example 1

| Sn | R | D | Nd | vd |
|---|---|---|---|---|
| *1 | −7.9757 | 1.3547 | 1.53158 | 55.08 |
| *2 | −19.9590 | 0.1991 | | |
| 3 | 16.9980 | 0.4181 | 1.65160 | 58.55 |
| 4 | 4.8930 | 1.6622 | | |
| 5 | 11.6420 | 0.2989 | 1.72916 | 54.68 |
| 6 | 4.3701 | 1.4660 | | |
| 7 | 149.0346 | 0.2631 | 1.62041 | 60.29 |
| 8 | 5.6460 | 1.3883 | | |
| 9 | −7.1486 | 2.1909 | 1.80400 | 46.58 |
| 10 | −9.8201 | 0.0683 | | |
| 11 | 23.7198 | 1.6428 | 1.80400 | 46.58 |

TABLE 1A-continued

Example 1

| Sn | R | D | Nd | vd |
|---|---|---|---|---|
| 12 | −15.4185 | 8.0449 | | |
| 13 | −26.9833 | 0.7435 | 1.80809 | 22.76 |
| 14 | −9.8236 | 2.2186 | | |
| 15 | 16.3092 | 2.5350 | 1.43875 | 94.66 |
| 16 | −6.3457 | 0.2390 | 1.80518 | 25.42 |
| 17 | −9.7816 | 0.5750 | | |
| 18 | 58.6136 | 0.2389 | 1.84666 | 23.78 |
| 19 | 6.0897 | 3.0893 | 1.49700 | 81.61 |
| 20 | −10.1069 | 0.4064 | | |
| *21 | −14.0034 | 1.2947 | 1.51633 | 64.06 |
| *22 | −7.9676 | 12.9665 | | |

TABLE 1B

Example 1

| Sn | R | D | Nd | vd |
|---|---|---|---|---|
| 23 | 12.7770 | 2.7908 | 1.80400 | 46.58 |
| 24 | −67.9187 | DD[24] | | |
| 25 | −12.7865 | 0.7973 | 1.76182 | 26.52 |
| 26 | 19.8908 | 1.7401 | | |
| 27 | −24.3688 | 2.8456 | 1.80518 | 25.42 |
| 28 | −10.1039 | 0.0669 | | |
| 29 | 8.8486 | 2.9878 | 1.80400 | 46.58 |
| 30 | 55.2923 | 1.0399 | | |
| 31 | −40.0531 | 0.5833 | 1.58913 | 61.13 |
| 32 | 7.7005 | DD[32] | | |
| 33 | 66.8494 | 0.6165 | 1.74950 | 35.28 |
| 34 | −17.5390 | DD[34] | | |
| 35(St) | ∞ | 0.0398 | | |
| 36 | 6.3527 | 1.2626 | 1.71299 | 53.87 |
| 37 | −9.1210 | 0.0433 | | |
| 38 | −8.6530 | 0.1990 | 1.72825 | 28.46 |
| 39 | 5.3173 | 1.8227 | | |
| 40 | −4.9106 | 0.1993 | 1.59551 | 39.24 |
| 41 | −28.0943 | 0.0399 | | |
| 42 | 23.2312 | 1.2000 | 1.43875 | 94.66 |
| 43 | −6.1829 | DD[43] | | |
| 44 | 8.6535 | 1.6603 | 1.43875 | 94.66 |
| 45 | −9.6853 | 1.7639 | | |
| 46 | −6.8345 | 0.2591 | 1.80440 | 39.58 |
| 47 | −229.5082 | 0.1678 | | |
| 48 | 92.6481 | 0.8133 | 1.80809 | 22.76 |
| 49 | −13.7749 | DD[49] | | |
| 50 | 18.1202 | 1.5782 | 1.89286 | 20.36 |
| 51 | −38.9136 | 2.5297 | | |
| 52 | ∞ | 4.9797 | 1.51633 | 64.14 |
| 53 | ∞ | 0.2091 | 1.51633 | 64.14 |
| 54 | ∞ | 0.0281 | | |

TABLE 2

Example 1

| | WIDE | MIDDLE | TELE |
|---|---|---|---|
| Zr | 1.0 | 1.5 | 2.0 |
| \|f\| | 1.0 | 1.5 | 2.0 |
| FNo. | 2.41 | 2.41 | 2.41 |
| 2ω(°) | 138.2 | 119.8 | 105.0 |
| DD[24] | 4.17 | 3.55 | 4.41 |
| DD[32] | 11.03 | 5.14 | 1.29 |
| DD[34] | 0.10 | 3.02 | 3.49 |
| DD[43] | 1.40 | 1.52 | 0.10 |
| DD[49] | 0.14 | 3.62 | 7.56 |

TABLE 3

Example 1

| Sn | 1 | 2 |
|---|---|---|
| KA | −7.129065340664E−01 | −2.204817460317E+02 |
| A3 | −2.509951819645E−02 | −2.245277947389E−02 |
| A4 | 2.258436836102E−02 | 1.241673597306E−02 |
| A5 | −4.096320252373E−03 | 1.410527979700E−03 |
| A6 | −4.752216522031E−04 | −1.665522743497E−03 |
| A7 | 2.597946080504E−04 | 1.715724635863E−04 |
| A8 | −1.597189973087E−05 | 6.676392268753E−05 |
| A9 | −6.159960818290E−06 | −1.330846446231E−05 |
| A10 | 9.840639048696E−07 | −1.245990859684E−06 |
| A11 | 4.435108517789E−08 | 4.447495802803E−07 |
| A12 | −1.930483863599E−08 | 2.894812052222E−09 |
| A13 | 5.796891498290E−10 | −7.971322196388E−09 |
| A14 | 1.757316627263E−10 | 2.720298518076E−10 |
| A15 | −1.292604163406E−11 | 8.009834424488E−11 |
| A16 | −6.440870908161E−13 | −4.630612566504E−12 |
| A17 | 8.739781649411E−14 | −4.262215753627E−13 |
| A18 | −3.722668267112E−16 | 3.143560736371E−14 |
| A19 | −2.082787628359E−16 | 9.357882986130E−16 |
| A20 | 5.928701551861E−18 | −8.023474940400E−17 |

| Sn | 21 | 22 |
|---|---|---|
| KA | 1.000000000000E+00 | 1.000000000000E+00 |
| A3 | −1.652482317395E−03 | −1.634619468535E−04 |
| A4 | 4.262262390267E−03 | 2.407662445817E−03 |
| A5 | −3.311474741143E−03 | 4.720777327140E−04 |
| A6 | 7.629203757756E−04 | −1.250525443159E−03 |
| A7 | 6.170352742780E−04 | 7.067276324267E−04 |
| A8 | −4.258175688881E−04 | −3.593643144892E−05 |
| A9 | 1.779789692480E−05 | −1.177064185369E−04 |
| A10 | 4.941300082479E−05 | 3.357853251978E−05 |
| A11 | −9.696537862207E−06 | 6.267509280947E−06 |
| A12 | −2.498293596301E−06 | −3.778376867355E−06 |
| A13 | 8.351601644683E−07 | 8.376855331413E−08 |
| A14 | 4.490316418728E−08 | 1.797909778427E−07 |
| A15 | −3.319840215799E−08 | −1.991769429656E−08 |
| A16 | 7.248700740760E−10 | −3.615061185259E−09 |
| A17 | 6.475987028654E−10 | 6.798146764034E−10 |
| A18 | −3.909579259759E−11 | 1.204961706620E−11 |
| A19 | −5.021301271375E−12 | −7.438651563275E−12 |
| A20 | 4.158362201971E−13 | 3.278064091599E−13 |

Figure 2:
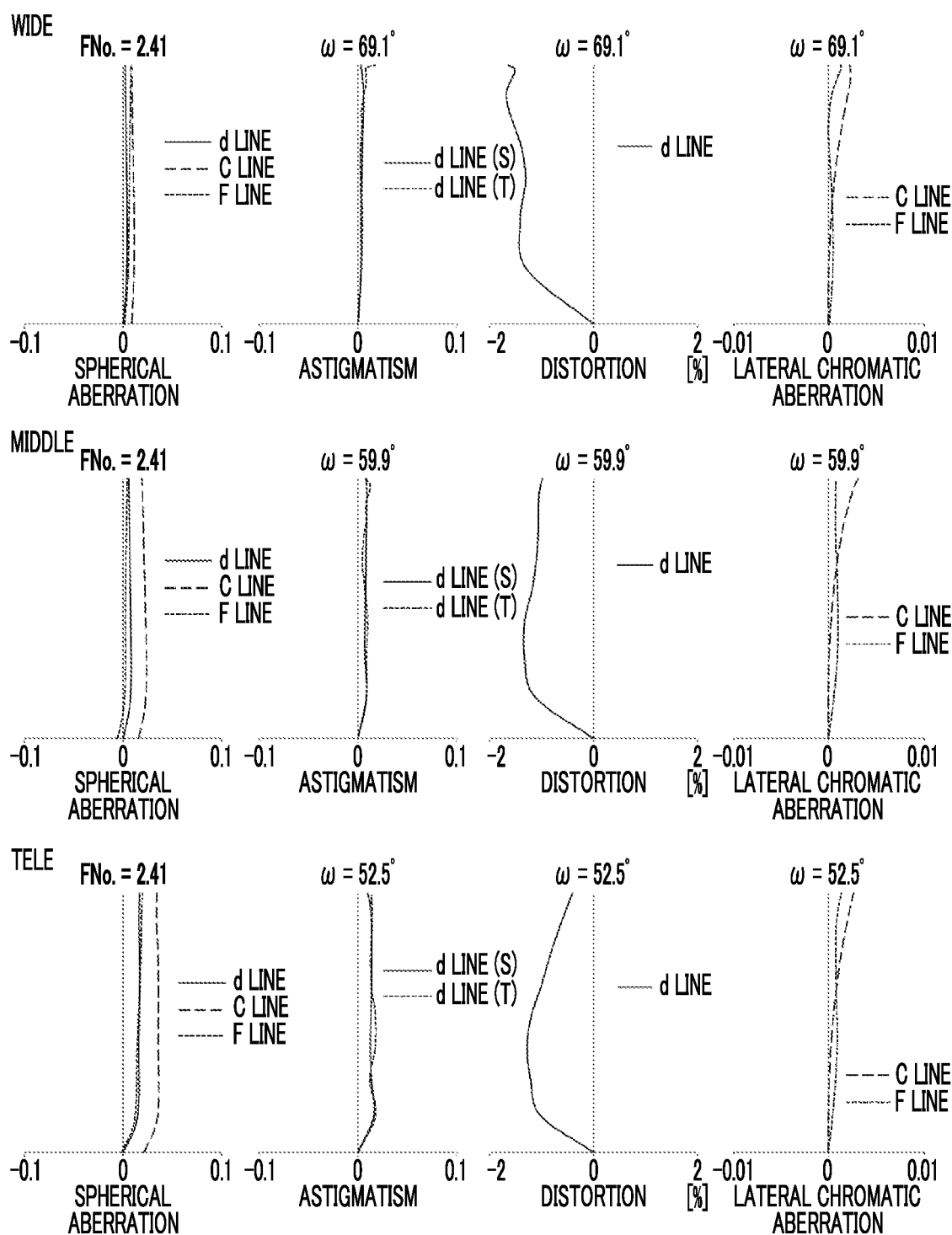
FIG. 2 is a diagram showing aberrations of the zoom lens of Example 1.

FIG. 2 shows a diagram of aberrations of the zoom lens of Example 1. In FIG. 2, the upper part labeled "WIDE" shows aberration diagrams at the wide angle end, the middle part labeled "MIDDLE" shows aberration diagrams in the intermediate focal length state, and the lower part labeled "TELE" shows aberration diagrams in the telephoto end state. FIG. 2 shows, in order from the left, spherical aberration, astigmatism, distortion, and lateral chromatic aberration. In the spherical aberration diagram, aberrations at the d line, C line, and F line are indicated by the solid line, the long broken line, and the short broken line, respectively. In the astigmatism diagram, the aberration at the d line in the sagittal direction is indicated by a solid line, and the aberration at the d line in the tangential direction is indicated by the short broken line. In the distortion diagram, aberration at the d line is indicated by the solid line. In lateral chromatic aberration diagram, aberrations at the C line and the F line are indicated by the long broken line and the short broken line, respectively. In the spherical aberration diagram, the value of the F number is shown after "FNo.=". In other aberration diagrams, the value of the maximum half angle of view is shown after "ω=". FIG. 2 shows data in a case where a distance on the optical axis Z from the magnification side imaging plane to the first optical system G1 is 149.9.

Unless otherwise specified, the following examples are the same as this example in that the symbol, meaning, description method, and illustration method are the same and the absolute value of the focal length of each data relating to the above-mentioned Example 1 are standardized to 1.0, and repeated description thereof will not be given below.

Example 2

Figure 3:
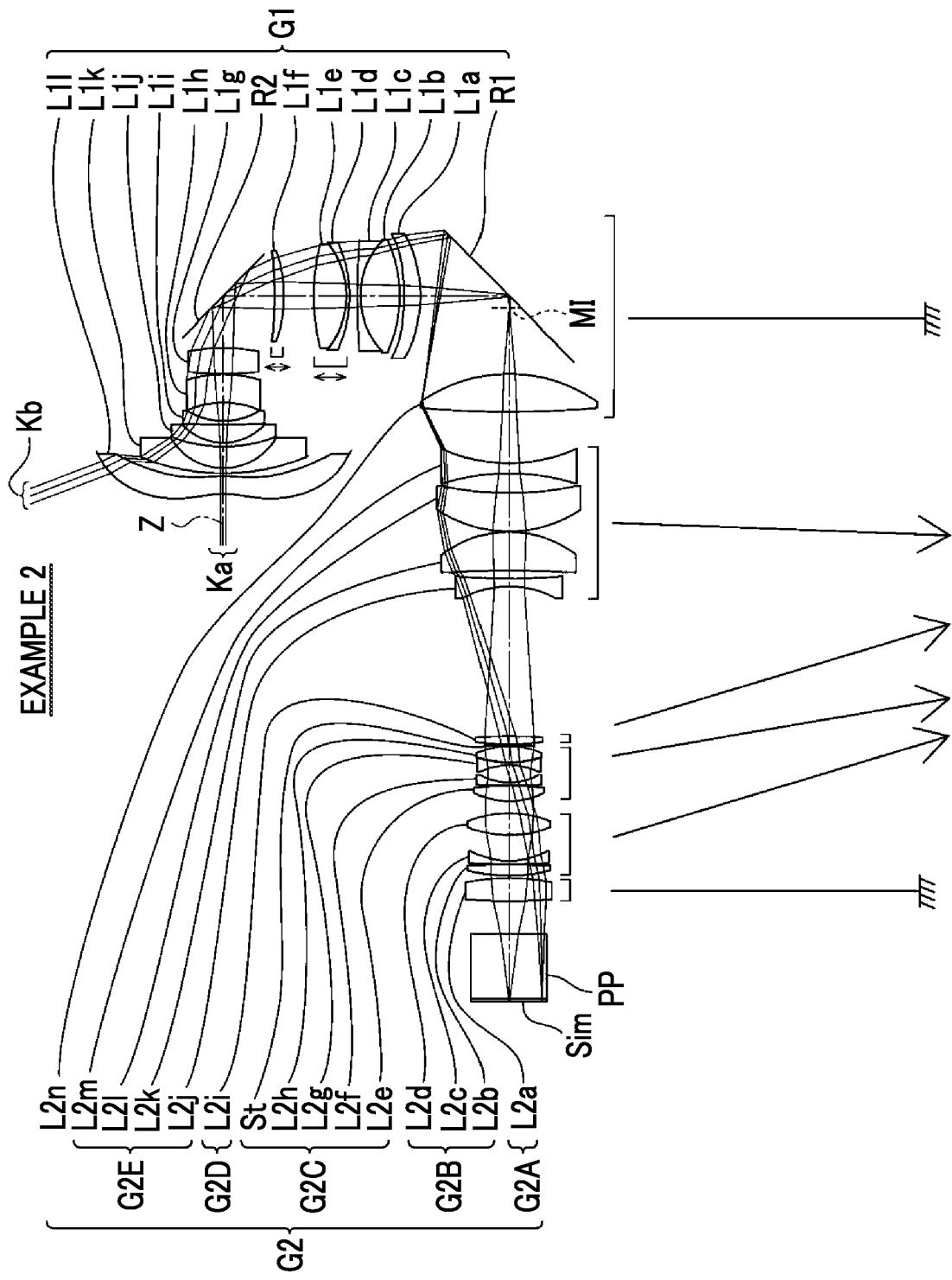
FIG. 3 is a cross-sectional view showing a configuration and a luminous flux of a zoom lens of Example 2.

FIG. 3 shows a cross-sectional view of a lens configuration and a luminous flux of the zoom lens of Example 2. The zoom lens of Example 2 consists of a first optical system G1 and a second optical system G2 in order from the magnification side to the reduction side. An intermediate image MI is formed on the optical path between the first optical system G1 and the second optical system G2.

The first optical system G1 consists of mirrors R1, lenses L1a to L1f, mirrors R2, and lenses L1g to L1l in order from the reduction side to the magnification side. The second optical system G2 consists of a second A lens group G2A, a second B lens group G2B, a second C lens group G2C, a second D lens group G2D, a second E lens group G2E, and a lens L2n in order from the reduction side to the magnification side. The second A lens group G2A consists of a lens L2a. The second B lens group G2B consists of lenses L2b to L2d. The second C lens group G2C consists of lenses L2e to L2h and an aperture stop St. The second D lens group G2D consists of a lens L2i. The second E lens group G2E consists of lenses L2j to L2m.

Then, during zooming, the second B lens group G2B, the second C lens group G2C, the second D lens group G2D, and the second E lens group G2E move along the axis Z by changing the distances between the adjacent groups in the direction of the optical axis Z, and the second A lens group G2A, the lens L2n, and the first optical system G1 remain stationary with respect to the reduction side imaging plane. The zoom lens of Example 2 consists of six lens groups.

The zoom lens of Example 2 has two focus groups. The first focus group consists of a cemented lens in which the lens L1d and the lens L1e are cemented. The second focus group consists of a single lens of lens L1f. During focusing, the first focus group and the second focus group move by changing the mutual distance in the direction of the optical axis Z.

Figure 4:
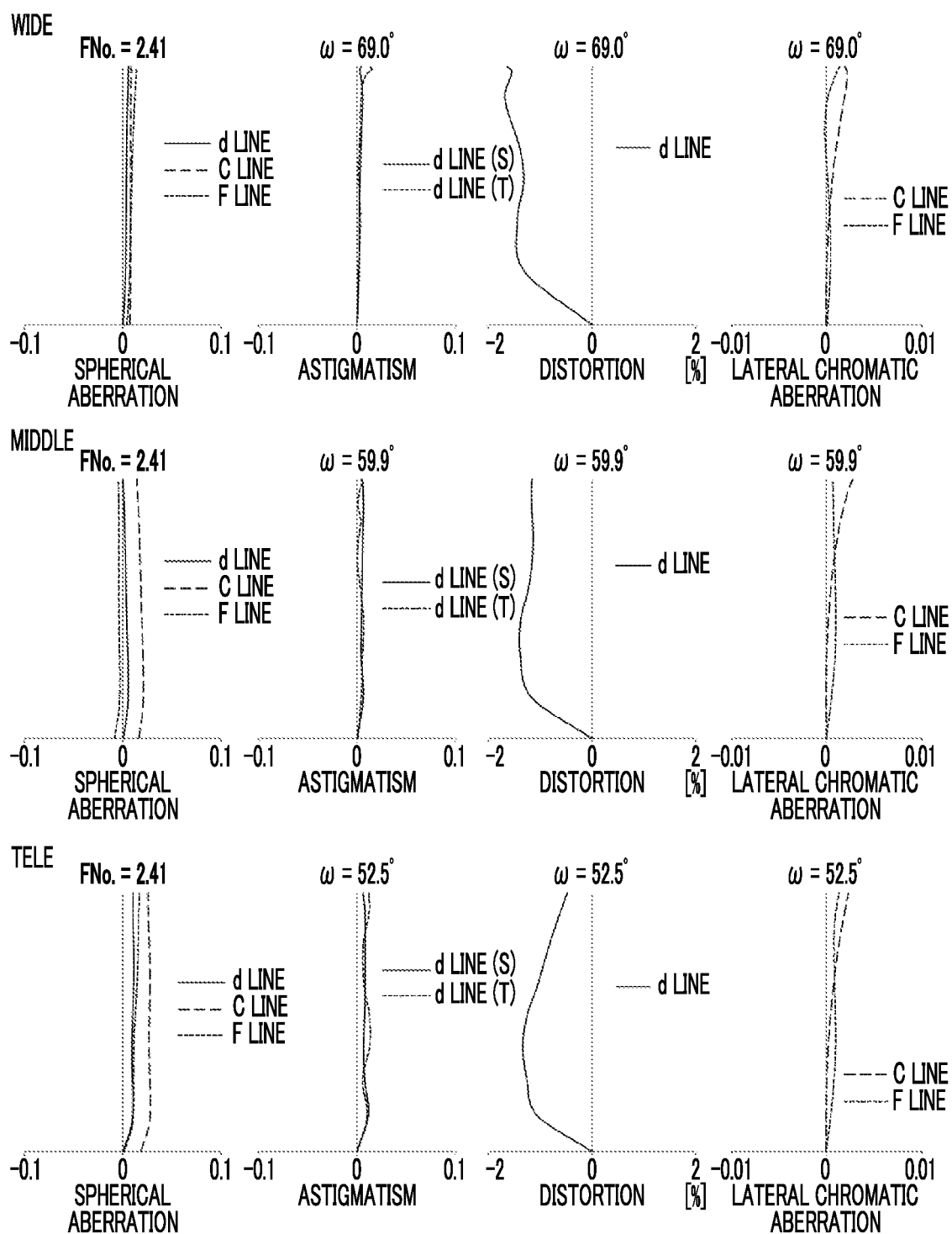
FIG. 4 is a diagram showing aberrations of the zoom lens of Example 2.

Regarding the zoom lens of Example 2, Tables 4A and 4B show basic lens data, Table 5 shows specifications and variable surface spacings, Table 6 shows aspherical coefficients, and FIG. 4 shows aberration diagrams in a case where the distance on the optical axis Z from the magnification side imaging plane to the first optical system G1 is 149.9.

TABLE 4A

Example 2

| Sn | R | D | Nd | vd |
|---|---|---|---|---|
| *1 | −7.9076 | 1.3546 | 1.53158 | 55.08 |
| *2 | −19.9175 | 0.2181 | | |
| 3 | 17.2973 | 0.4184 | 1.65160 | 58.55 |
| 4 | 4.8848 | 1.6665 | | |
| 5 | 11.6684 | 0.2987 | 1.72916 | 54.68 |
| 6 | 4.4400 | 1.4227 | | |
| 7 | 88.9615 | 0.2629 | 1.62041 | 60.29 |
| 8 | 5.4548 | 1.4208 | | |
| 9 | −7.1277 | 2.1911 | 1.80400 | 46.58 |
| 10 | −9.9889 | 0.0400 | | |
| 11 | 23.6527 | 1.9992 | 1.80400 | 46.58 |
| 12 | −15.0803 | 8.0439 | | |
| 13 | −28.9479 | 0.7360 | 1.80809 | 22.76 |
| 14 | −10.2122 | 2.3604 | | |
| 15 | 16.3823 | 2.5770 | 1.43875 | 94.66 |
| 16 | −6.4053 | 0.2389 | 1.80518 | 25.42 |
| 17 | −9.8310 | 0.6302 | | |
| 18 | 70.7006 | 0.2390 | 1.84666 | 23.78 |

TABLE 4A-continued

Example 2

| Sn | R | D | Nd | vd |
|---|---|---|---|---|
| 19 | 6.1370 | 3.0894 | 1.49700 | 81.61 |
| 20 | −10.2160 | 0.3633 | | |
| *21 | −14.7847 | 1.2947 | 1.51633 | 64.06 |
| *22 | −7.9671 | 12.9465 | | |

TABLE 4B

Example 2

| Sn | R | D | Nd | vd |
|---|---|---|---|---|
| 23 | 12.2561 | 2.9461 | 1.80400 | 46.58 |
| 24 | −77.2390 | DD[24] | | |
| 25 | −13.1151 | 0.7966 | 1.76182 | 26.52 |
| 26 | 17.9625 | 1.5051 | | |
| 27 | −26.2823 | 2.9875 | 1.80518 | 25.42 |
| 28 | −10.1815 | 0.0398 | | |
| 29 | 8.7624 | 2.9875 | 1.80400 | 46.58 |
| 30 | 66.9962 | 0.6301 | | |
| 31 | −47.8103 | 0.5977 | 1.58913 | 61.13 |
| 32 | 7.6424 | DD[32] | | |
| 33 | 57.3316 | 0.6138 | 1.74950 | 35.28 |
| 34 | −18.0316 | DD[34] | | |
| 35(St) | ∞ | 0.0399 | | |
| 36 | 6.3073 | 1.2424 | 1.69680 | 55.53 |
| 37 | −8.7478 | 0.0325 | | |
| 38 | −8.3849 | 0.1994 | 1.72825 | 28.46 |
| 39 | 5.3492 | 1.3257 | | |
| 40 | −4.8791 | 0.2289 | 1.59551 | 39.24 |
| 41 | −99.1629 | 0.0398 | | |
| 42 | 21.6115 | 1.1998 | 1.45650 | 90.27 |
| 43 | −6.1365 | DD[43] | | |
| 44 | 8.7291 | 1.6773 | 1.43875 | 94.66 |
| 45 | −9.1683 | 2.0061 | | |
| 46 | −6.3378 | 0.2590 | 1.80610 | 40.93 |
| 47 | −62.3793 | 0.0397 | | |
| 48 | 78.8909 | 0.8488 | 1.80809 | 22.76 |
| 49 | −12.9390 | DD[49] | | |
| 50 | 17.5899 | 1.7795 | 1.89286 | 20.36 |
| 51 | −39.8773 | 2.5295 | | |
| 52 | ∞ | 4.9794 | 1.51633 | 64.14 |
| 53 | ∞ | 0.2091 | 1.51633 | 64.14 |
| 54 | ∞ | 0.0256 | | |

TABLE 5

Example 2

| | WIDE | MIDDLE | TELE |
|---|---|---|---|
| Zr | 1.0 | 1.5 | 2.0 |
| \|f\| | 1.0 | 1.5 | 2.0 |
| FNo. | 2.41 | 2.41 | 2.41 |
| 2ω(°) | 138.0 | 119.8 | 105.0 |
| DD[24] | 3.97 | 3.37 | 4.05 |
| DD[32] | 11.62 | 5.54 | 1.70 |
| DD[34] | 0.10 | 3.37 | 3.86 |
| DD[43] | 0.93 | 1.19 | 0.10 |
| DD[49] | 0.20 | 3.36 | 7.11 |

TABLE 6

Example 2

| Sn | 1 | 2 |
|---|---|---|
| KA | −7.125250585192E−01 | −2.173295965806E+02 |
| A3 | −2.657126629107E−02 | −2.418919615761E−02 |
| A4 | 2.356606744837E−02 | 1.349906820549E−02 |

TABLE 6-continued

Example 2

| | | |
|---|---|---|
| A5  | -4.245786345567E-03  | 1.362228474816E-03 |
| A6  | -5.162727724147E-04  | -1.767331906448E-03 |
| A7  | 2.752325033301E-04   | 1.898029436868E-04 |
| A8  | -1.627533562437E-05  | 7.076993010844E-05 |
| A9  | -6.674186860013E-06  | -1.450082941842E-05 |
| A10 | 1.044996133028E-06   | -1.310692750019E-06 |
| A11 | 5.072944254625E-08   | 4.836599399743E-07 |
| A12 | -2.090803822290E-08  | 2.536591745737E-09 |
| A13 | 5.920753226630E-10   | -8.687859824519E-09 |
| A14 | 1.938450386881E-10   | 3.021568264466E-10 |
| A15 | -1.396230021405E-11  | 8.765369074892E-11 |
| A16 | -7.281086785739E-13  | -5.098366689812E-12 |
| A17 | 9.641868103882E-14   | -4.687961676866E-13 |
| A18 | -3.591446974526E-16  | 3.464000300969E-14 |
| A19 | -2.335100345004E-16  | 1.035201480596E-15 |
| A20 | 6.651692452794E-18   | -8.868687215940E-17 |

| Sn | 21 | 22 |
|---|---|---|
| KA  | 1.000000000000E+00  | 1.000000000000E+00 |
| A3  | -1.189160703338E-03 | -1.628371982061E-05 |
| A4  | 3.784162623285E-03  | 2.309512669279E-03 |
| A5  | -3.136536619849E-03 | 3.694382302366E-04 |
| A6  | 8.083760079830E-04  | -1.187935194638E-03 |
| A7  | 5.594606187786E-04  | 7.151358269646E-04 |
| A8  | -4.097788541675E-04 | -4.834447517677E-05 |
| A9  | 2.078851519349E-05  | -1.162013917055E-04 |
| A10 | 4.641278203757E-05  | 3.449328475274E-05 |
| A11 | -9.301616560602E-06 | 5.998712500760E-06 |
| A12 | -2.301321238618E-06 | -3.784975255597E-06 |
| A13 | 7.782930262603E-07  | 9.764923152176E-08 |
| A14 | 4.024042409897E-08  | 1.775748966613E-07 |
| A15 | -3.036398806511E-08 | -2.009278273694E-08 |
| A16 | 6.773987056164E-10  | -3.516265516632E-09 |
| A17 | 5.830632731873E-10  | 6.742979303452E-10 |
| A18 | -3.516127760951E-11 | 1.072830403458E-11 |
| A19 | -4.456246692072E-12 | -7.312585479508E-12 |
| A20 | 3.676228474631E-13  | 3.292049531661E-13 |

Example 3

Figure 5:
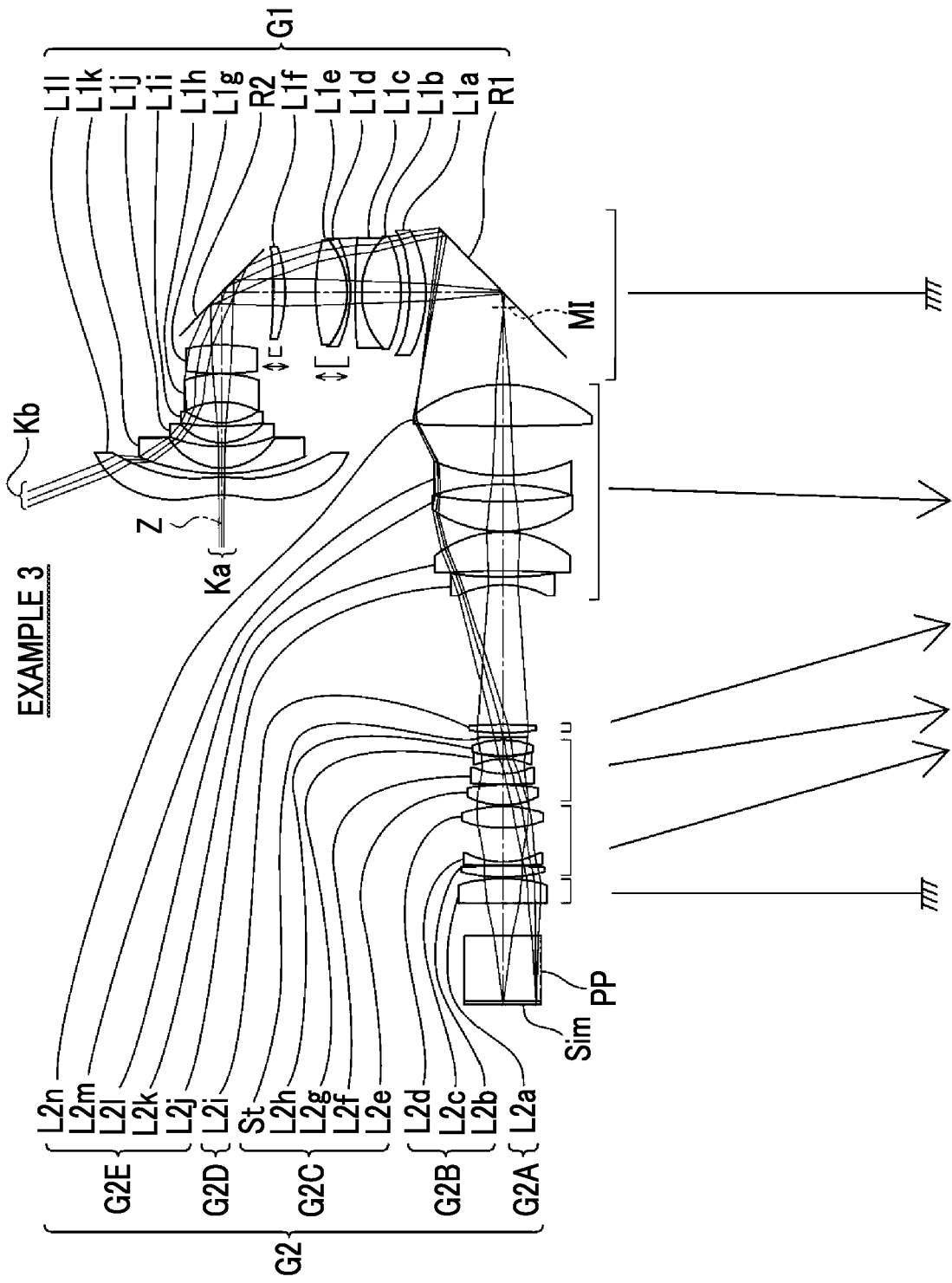
FIG. 5 is a cross-sectional view showing a configuration and a luminous flux of a zoom lens of Example 3.

FIG. 5 shows a cross-sectional view of a lens configuration and a luminous flux of the zoom lens of Example 3. The zoom lens of Example 3 consists of a first optical system G1 and a second optical system G2 in order from the magnification side to the reduction side. An intermediate image MI is formed on the optical path between the first optical system G1 and the second optical system G2.

The first optical system G1 consists of mirrors R1, lenses L1a to L1f, mirrors R2, and lenses L1g to L1l in order from the reduction side to the magnification side. The second optical system G2 consists of a second A lens group G2A, a second B lens group G2B, a second C lens group G2C, a second D lens group G2D, and a second E lens group G2E in order from the reduction side to the magnification side. The second A lens group G2A consists of a lens L2a. The second B lens group G2B consists of lenses L2b to L2d. The second C lens group G2C consists of lenses L2e to L2h and an aperture stop St. The second D lens group G2D consists of a lens L2i. The second E lens group G2E consists of lenses L2j to L2n.

Then, during zooming, the second B lens group G2B, the second C lens group G2C, the second D lens group G2D, and the second E lens group G2E move along the axis Z by changing the distances between the adjacent groups in the direction of the optical axis Z, and the second A lens group G2A and the first optical system G1 remain stationary with respect to the reduction side imaging plane. The zoom lens of Example 3 consists of six lens groups.

The zoom lens of Example 3 has two focus groups. The first focus group consists of a cemented lens in which the lens L1d and the lens L1e are cemented. The second focus group consists of a single lens of lens L1f. During focusing, the first focus group and the second focus group move by changing the mutual distance in the direction of the optical axis Z.

Figure 6:
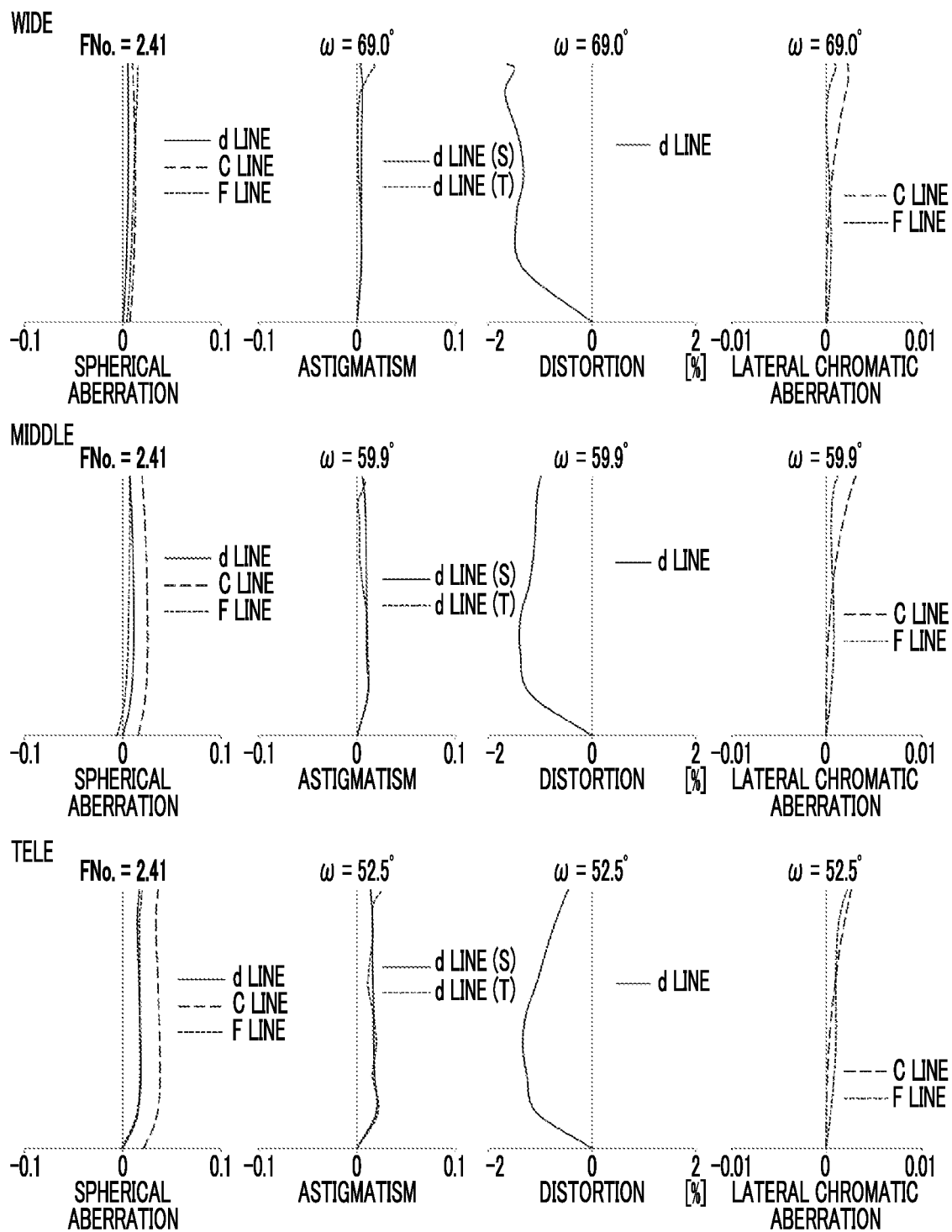
FIG. 6 is a diagram showing aberrations of the zoom lens of Example 3.

Regarding the zoom lens of Example 3, Tables 7A and 7B show basic lens data, Table 8 shows specifications and variable surface spacings, Table 9 shows aspherical coefficients, and FIG. 6 shows aberration diagrams in a case where the distance on the optical axis Z from the magnification side imaging plane to the first optical system G1 is 149.9.

TABLE 7A

Example 3

| Sn | R | D | Nd | vd |
|---|---|---|---|---|
| *1  | -7.7773   | 1.3543  | 1.53158 | 55.08 |
| *2  | -19.9137  | 0.3001  |         |       |
| 3   | 16.9882   | 0.4180  | 1.65160 | 58.54 |
| 4   | 4.9067    | 1.6495  |         |       |
| 5   | 11.4032   | 0.3064  | 1.74400 | 44.79 |
| 6   | 4.3865    | 1.2669  |         |       |
| 7   | 21.5939   | 0.2630  | 1.62041 | 60.29 |
| 8   | 4.9047    | 1.6054  |         |       |
| 9   | -6.2095   | 2.1717  | 1.80400 | 46.58 |
| 10  | -9.0057   | 0.0398  |         |       |
| 11  | 24.8432   | 2.1905  | 1.80400 | 46.58 |
| 12  | -14.4209  | 8.0472  |         |       |
| 13  | -29.5479  | 0.9253  | 1.80809 | 22.76 |
| 14  | -10.4383  | 2.3949  |         |       |
| 15  | 15.8711   | 2.4848  | 1.43875 | 94.66 |
| 16  | -6.4292   | 0.2391  | 1.84666 | 23.78 |
| 17  | -9.5453   | 0.3836  |         |       |
| 18  | 61.0100   | 0.5169  | 1.84666 | 23.78 |
| 19  | 6.1359    | 3.0886  | 1.49700 | 81.61 |
| 20  | -10.2921  | 0.6647  |         |       |
| *21 | -14.4261  | 1.2942  | 1.51633 | 64.06 |
| *22 | -7.9656   | DD[22]  |         |       |

TABLE 7B

Example 3

| Sn | R | D | Nd | vd |
|---|---|---|---|---|
| 23    | 11.3838    | 3.2020  | 1.80610 | 40.93 |
| 24    | -157.8296  | 3.8103  |         |       |
| 25    | -13.4818   | 0.6763  | 1.80518 | 25.42 |
| 26    | 18.1126    | 1.3192  |         |       |
| 27    | -31.7601   | 2.3193  | 1.78880 | 28.43 |
| 28    | -9.6429    | 0.0399  |         |       |
| 29    | 8.5913     | 2.9870  | 1.80400 | 46.58 |
| 30    | 61.4199    | 0.4848  |         |       |
| 31    | -28.6898   | 0.5974  | 1.58313 | 59.37 |
| 32    | 7.4830     | DD[32]  |         |       |
| 33    | 34.9149    | 0.6666  | 1.80518 | 25.42 |
| 34    | -15.9409   | DD[34]  |         |       |
| 35(St)| ∞          | 0.2116  |         |       |
| 36    | 6.4936     | 1.2196  | 1.69680 | 55.53 |
| 37    | -8.9573    | 0.0562  |         |       |
| 38    | -8.1966    | 0.1991  | 1.80000 | 29.84 |
| 39    | 5.3859     | 1.1389  |         |       |
| 40    | -5.2873    | 0.7995  | 1.75520 | 27.51 |
| 41    | -38.2306   | 0.0399  |         |       |
| 42    | 15.3762    | 1.5747  | 1.43875 | 94.66 |
| 43    | -6.0942    | DD[43]  |         |       |
| 44    | 10.3280    | 1.6603  | 1.45650 | 90.27 |
| 45    | -9.6949    | 2.6221  |         |       |
| 46    | -6.0964    | 0.2591  | 1.74950 | 35.28 |
| 47    | -82.3001   | 0.0400  |         |       |
| 48    | 65.8405    | 0.8658  | 1.80809 | 22.76 |
| 49    | -13.6500   | DD[49]  |         |       |

TABLE 7B-continued

Example 3

| Sn | R | D | Nd | vd |
|---|---|---|---|---|
| 50 | 12.1608 | 1.9089 | 1.89286 | 20.36 |
| 51 | −467.0656 | 2.5291 | | |
| 52 | ∞ | 4.9785 | 1.51633 | 64.14 |
| 53 | ∞ | 0.2091 | 1.51633 | 64.14 |
| 54 | ∞ | 0.0268 | | |

TABLE 8

Example 3

| | WIDE | MIDDLE | TELE |
|---|---|---|---|
| Zr | 1.0 | 1.5 | 2.0 |
| |f| | 1.0 | 1.5 | 2.0 |
| FNo. | 2.41 | 2.41 | 2.41 |
| 2ω(°) | 138.0 | 119.8 | 105.0 |
| DD[22] | 13.05 | 13.58 | 14.27 |
| DD[32] | 10.77 | 4.64 | 1.12 |
| DD[34] | 0.32 | 1.93 | 2.24 |
| DD[43] | 0.10 | 0.74 | 0.10 |
| DD[49] | 0.10 | 3.45 | 6.60 |

TABLE 9

Example 3

| Sn | 1 | 2 |
|---|---|---|
| KA | −6.644507793526E−01 | −1.726211138561E+02 |
| A3 | −2.691792214400E−02 | −2.353330321822E−02 |
| A4 | 2.408475058936E−02 | 1.377690424065E−02 |
| A5 | −4.337276061487E−03 | 1.379587272547E−03 |
| A6 | −5.397187080221E−04 | −1.842175511015E−03 |
| A7 | 2.843400241519E−04 | 2.012261487425E−04 |
| A8 | −1.640774845587E−05 | 7.511202368230E−05 |
| A9 | −6.984518854812E−06 | −1.559825231919E−05 |
| A10 | 1.079986170871E−06 | −1.417994104354E−06 |
| A11 | 5.463037850055E−08 | 5.297773088324E−07 |
| A12 | −2.185472715226E−08 | 2.788990627693E−09 |
| A13 | 6.014346930959E−10 | −9.693592978523E−09 |
| A14 | 2.045222440524E−10 | 3.397266058514E−10 |
| A15 | −1.465158442295E−11 | 9.961967076840E−11 |
| A16 | −7.742007962859E−13 | −5.839076997376E−12 |
| A17 | 1.024742526925E−13 | −5.426525257601E−13 |
| A18 | −3.952739375672E−16 | 4.041220269823E−14 |
| A19 | −2.506764309537E−16 | 1.220331971306E−15 |
| A20 | 7.234390247682E−18 | −1.053877620354E−16 |

| Sn | 21 | 22 |
|---|---|---|
| KA | 1.000000000000E+00 | 1.000000000000E+00 |
| A3 | −1.461840245686E−03 | 2.595833113763E−04 |
| A4 | 3.713068904568E−03 | 1.774560048339E−03 |
| A5 | −2.795471687902E−03 | 7.981455290682E−04 |
| A6 | 7.766198648758E−04 | −1.109207084608E−03 |
| A7 | 4.572337710741E−04 | 5.821819354564E−04 |
| A8 | −3.756090850682E−04 | −3.683337917356E−05 |
| A9 | 2.933875527057E−05 | −9.846037864989E−05 |
| A10 | 4.064843093390E−05 | 3.069989362280E−05 |
| A11 | −9.200164135374E−06 | 4.807880062866E−06 |
| A12 | −1.885780170356E−06 | −3.386621776220E−06 |
| A13 | 7.232281596103E−07 | 1.301400446832E−07 |
| A14 | 2.652896176383E−08 | 1.571777318993E−07 |
| A15 | −2.712995802792E−08 | −1.977600926304E−08 |
| A16 | 8.213281359321E−10 | −3.003811506462E−09 |
| A17 | 5.042468966683E−10 | 6.398296062980E−10 |
| A18 | −3.297326506632E−11 | 5.674705297861E−12 |
| A19 | −3.740390117812E−12 | −6.819011287975E−12 |
| A20 | 3.223379097188E−13 | 3.300939480085E−13 |

Table 10 shows the corresponding values of Conditional Expressions (1) to (6) of the zoom lenses of Examples 1 to 3. Table 10 shows values in a case where the d line is used as a reference.

TABLE 10

| Expression Number | | Example 1 | Example 2 | Example 3 |
|---|---|---|---|---|
| (1) | f2w/fAp | 0.47 | 0.81 | 1.41 |
| (2) | ZAp/|fw| | 6.11 | 6.08 | 6.50 |
| (3) | vAp | 74.26 | 72.90 | 75.10 |
| (4) | |fw|/f2w | −0.04 | −0.04 | −0.03 |
| (5) | fR/fAp | −0.31 | −0.45 | −0.77 |
| (6) | Bfw/|fw| | 5.97 | 5.97 | 5.96 |

As can be seen from the above-mentioned data, the zoom lenses of Examples 1 to 3 each have a wide angle of view in that a maximum total angle of view is 125 degrees or more at the wide angle end and have a high magnification in that a zoom magnification is 1.5 times or more, the F number in the entire zoom range is constant at a value of 2.5 or less, and aberrations are satisfactorily corrected, thereby achieving high optical performance.

Figure 7:
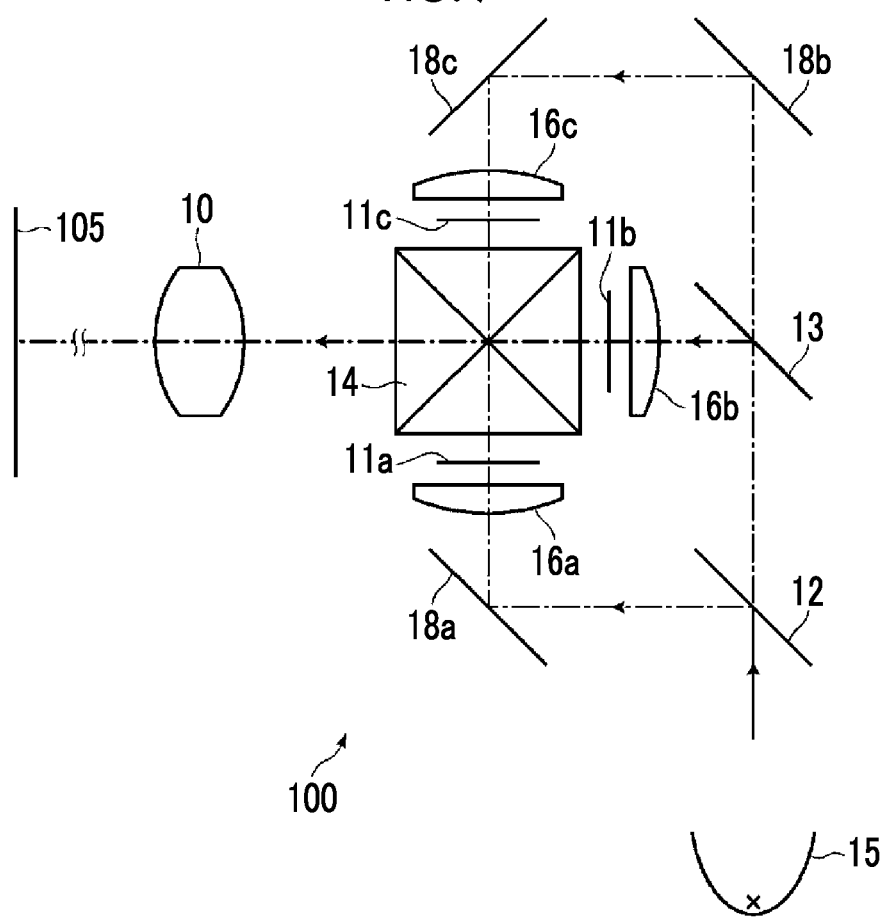
FIG. 7 is a schematic configuration diagram of a projection type display device according to an embodiment.

Next, a projection type display device according to an embodiment of the present disclosure will be described. FIG. 7 is a schematic configuration diagram of a projection type display device according to an embodiment of the present disclosure. The projection type display device 100 shown in FIG. 7 has the zoom lens 10 according to the embodiment of the present disclosure, a light source 15, transmissive display elements 11a to 11c as light valves each corresponding to each color light, dichroic mirrors 12 and 13 for color separation, a cross dichroic prism 14 for color synthesis, condenser lenses 16a to 16c, and total reflection mirrors 18a to 18c that deflect the optical path. It should be noted that FIG. 7 schematically shows the zoom lens 10. Further, an integrator is disposed between the light source 15 and the dichroic mirror 12, but is not shown in FIG. 7.

White light originating from the light source 15 is separated into ray with three colors (green light, blue light, and red light) through the dichroic mirrors 12 and 13. Thereafter, the ray respectively pass through the condenser lenses 16a to 16c, are incident into and modulated through the transmissive display elements 11a to 11c respectively corresponding to the ray with the respective colors, are subjected to color synthesis through the cross dichroic prism 14, and are subsequently incident into the zoom lens 10. The zoom lens 10 projects an optical image of the modulated light modulated through the transmissive display elements 11a to 11c onto the screen 105.

Figure 8:
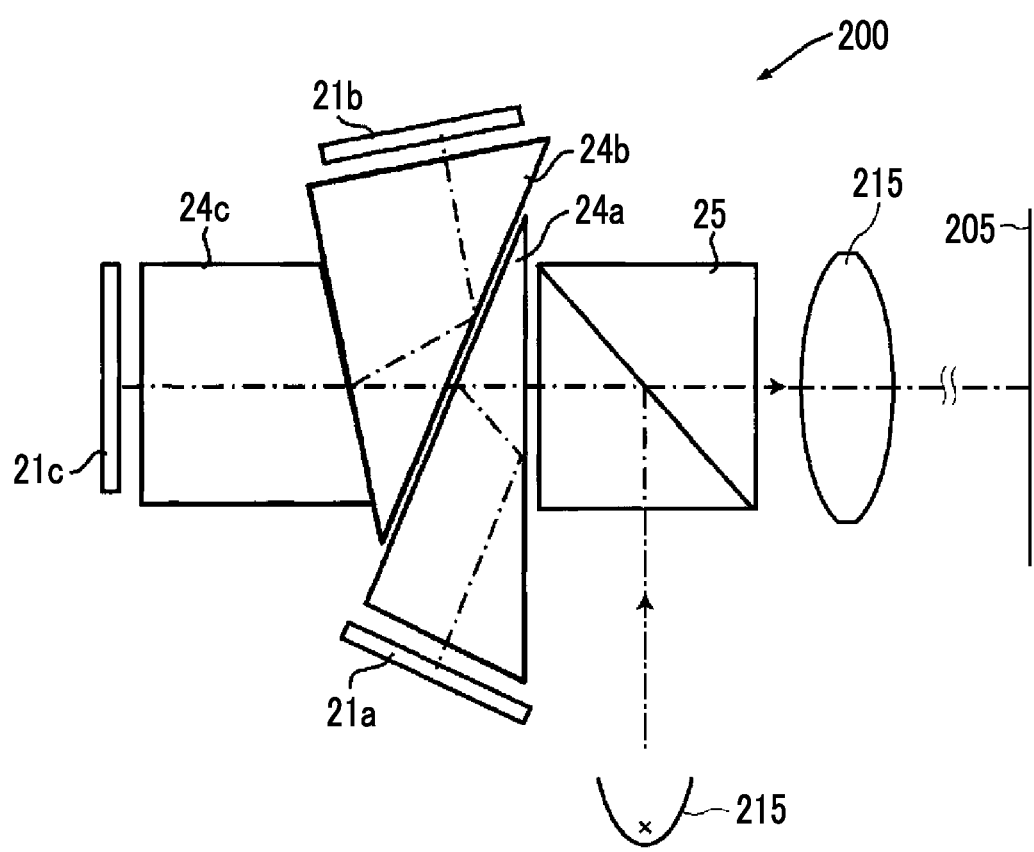
FIG. 8 is a schematic configuration diagram of a projection type display device according to another embodiment.

FIG. 8 is a schematic configuration diagram of a projection type display device according to another embodiment of the present disclosure. The projection type display device 200 shown in FIG. 8 has a zoom lens 210 according to the embodiment of the present disclosure, a light source 215, digital micromirror device (DMD: registered trademark) elements 21a to 21c as light valves corresponding to respective color ray, total internal reflection (TIR) prisms 24a to 24c for color separation and color synthesis, and a polarized light separating prism 25 that separates illumination light and projection light. It should be noted that FIG. 8 schematically shows the zoom lens 210. Further, an integrator is disposed between the light source 215 and the polarized light separating prism 25, but is not shown in FIG. 8.

White light originating from the light source 215 is reflected on a reflective surface inside the polarized light separating prism 25, and is separated into ray with three colors (green light, blue light, and red light) through the TIR prisms 24a to 24c. The separated ray with the respective colors are respectively incident into and modulated through the corresponding DMD elements 21a to 21c, travel through the TIR prisms 24a to 24c again in a reverse direction, are subjected to color synthesis, are subsequently transmitted through the polarized light separating prism 25, and are incident into the zoom lens 210. The zoom lens 210 projects an optical image of the modulated light modulated through the DMD elements 21a to 21c onto the screen 205.

Figure 9:
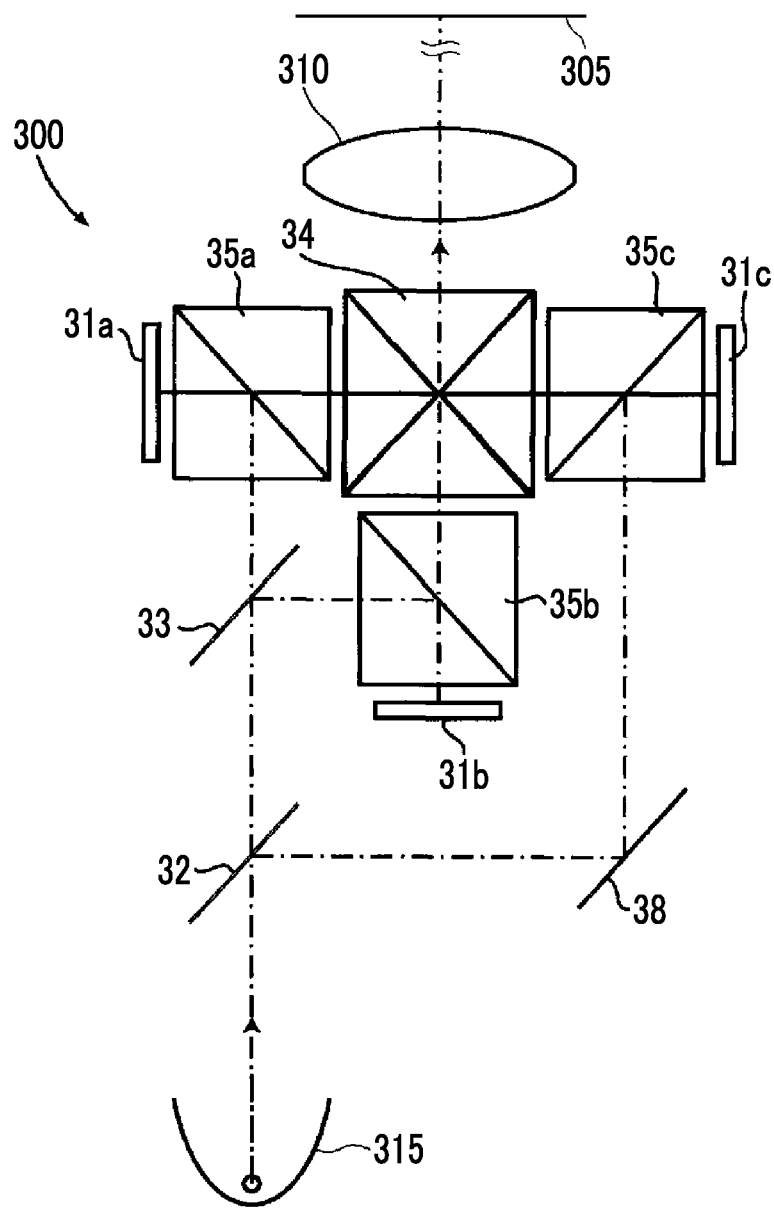
FIG. 9 is a schematic configuration diagram of a projection type display device according to still another embodiment.

FIG. 9 is a schematic configuration diagram of a projection type display device according to still another embodiment of the present disclosure. The projection type display device 300 shown in FIG. 9 has a zoom lens 310 according to the embodiment of the present disclosure, a light source 315, reflective display elements 31a to 31c as light valves each corresponding to each color light, dichroic mirrors 32 and 33 for color separation, a cross dichroic prism 34 for color synthesis, a total reflection mirror 38 for deflecting the optical path, and polarized light separating prisms 35a to 35c. It should be noted that FIG. 9 schematically shows the zoom lens 310. Further, an integrator is disposed between the light source 315 and the dichroic mirror 32, but is not shown in FIG. 9.

White light originating from the light source 315 is separated into ray with three colors (green light, blue light, and red light) through the dichroic mirrors 32 and 33. The separated ray with the respective colors respectively pass through the polarized light separating prisms 35a to 35c, are incident into and modulated through the reflective display elements 31a to 31c respectively corresponding to the ray with the respective colors, are subjected to color synthesis through the cross dichroic prism 34, and are subsequently incident into the zoom lens 310. The zoom lens 310 projects an optical image of the modulated light modulated through the reflective display elements 31a to 31c onto the screen 305.

Figure 10:
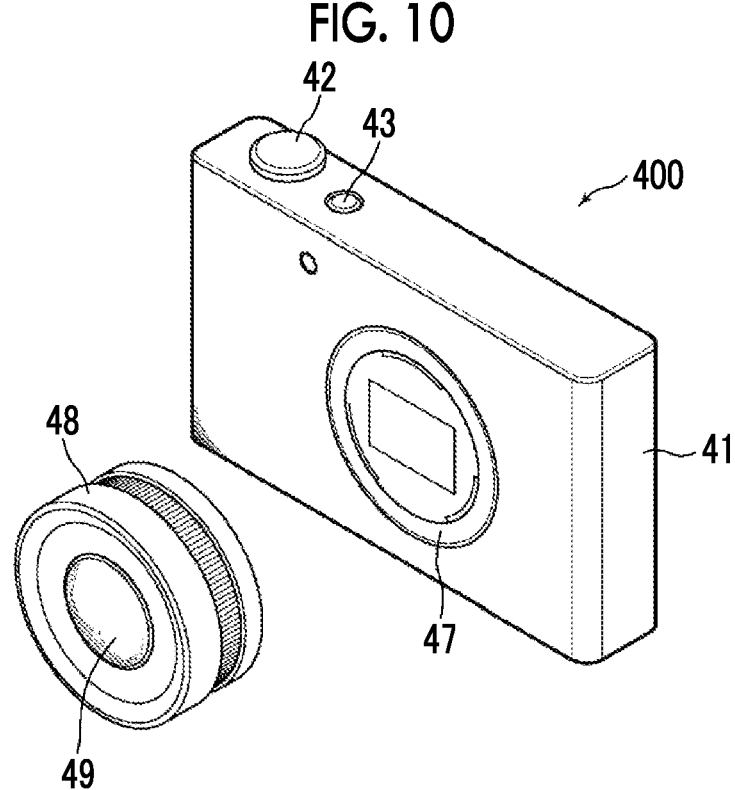
FIG. 10 is a perspective view of the front side of an imaging apparatus according to an embodiment.
Figure 11:
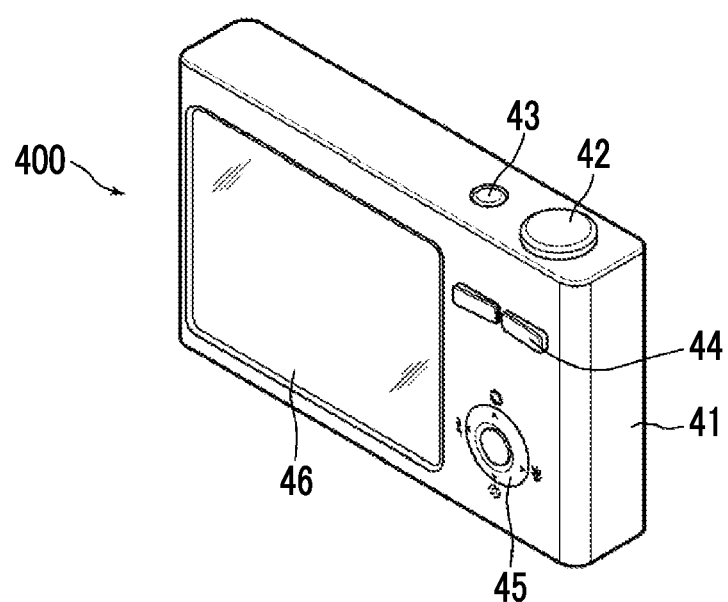
FIG. 11 is a rear perspective view of the imaging apparatus shown in FIG. 10.

FIGS. 10 and 11 are external views of a camera 400 which is the imaging apparatus according to the embodiment of the present disclosure. FIG. 10 is a perspective view of the camera 400 viewed from a front side, and FIG. 11 is a perspective view of the camera 400 viewed from a rear side. The camera 400 is a mirrorless single-lens type digital camera on which an interchangeable lens 48 is attachably and detachably mounted. The interchangeable lens 48 is a lens barrel containing a zoom lens 49 according to the embodiment of the present disclosure.

The camera 400 comprises a camera body 41, and a shutter button 42 and a power button 43 are provided on an upper surface of the camera body 41. Further, operating parts 44 and 45 and a display unit 46 are provided on a rear surface of the camera body 41. The display unit 46 displays a captured image or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown in the drawing) such as a charge coupled device (CCD) or a complementary metal oxide semiconductor (CMOS) outputs an imaging signal based on a subject image which is formed through the interchangeable lens 48. The signal processing circuit (not shown in the drawing) generates an image through processing of the imaging signal which is output from the imaging element. The recording medium (not shown in the drawing) records the generated image. The camera 400 captures a static image or a video by pressing the shutter button 42, and records image data, which is obtained through imaging, in the recording medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the numerical examples, and different values may be used therefor.

In addition, the projection type display device according to the technique of the present disclosure is not limited to the above-mentioned configuration, and may be modified into various forms such as the optical member used for ray separation or ray synthesis and the light valve. The light valve is not limited to a form in which light from a light source is spatially modulated through an image display element and is output as an optical image based on image data, but may be a form in which light itself output from the self-luminous image display element is output as an optical image based on the image data. Examples of the self-luminous image display element include an image display element in which light emitting elements such as light emitting diodes (LED) or organic light emitting diodes (OLED) are two-dimensionally arranged.

Further, the imaging apparatus according to the technique of the present disclosure is not limited to the above-mentioned configuration, and may be modified into various forms such as a non-mirrorless type camera, a film camera, a video camera, and a camera for movie imaging.

What is claimed is:

1. A zoom lens consisting of a first optical system and a second optical system in order from a magnification side to a reduction side along an optical path,
   wherein the second optical system forms an intermediate image at a position conjugate to a reduction side imaging plane,
   the first optical system reforms the intermediate image on a magnification side imaging plane,
   the zoom lens includes a lens at a position closest to the magnification side on the optical path of the first optical system,
   a group of which a distance to an adjacent group in an optical axis direction changes during zooming is defined as one lens group,
   the second optical system includes a plurality of lens groups that move during zooming,
   one of the plurality of lens groups that move during zooming is a lens group having an aperture stop that determines a numerical aperture,
   the lens group having the aperture stop has a negative refractive power, and wherein
   a focal length of the lens group having the aperture stop is fAp, and
   a focal length of the second optical system at a wide angle end is f2w,
   Conditional Expression (1) is satisfied, which is represented by $$0.1 < f2w/fAp < 2.1 \qquad (1),$$

the focal length of the lens group having the aperture stop is calculated by using every surface of the lens group having the aperture stop, and the focal length of the second optical system is calculated by using every surface of the second optical system.

2. The zoom lens according to claim 1, wherein a difference in the optical axis direction between a position of the lens group having the aperture stop at the wide angle end and a position of the lens group having the aperture stop at a telephoto end is ZAp, and a focal length of the zoom lens at the wide angle end is fw, Conditional Expression (2) is satisfied, which is represented by $$4 < ZAp/|fw| < 10 \tag{2}$$

3. The zoom lens according to claim 1, wherein an average of Abbe numbers of all positive lenses included in the lens group having the aperture stop based on a d line is vAp, Conditional Expression (3) is satisfied, which is represented by $$65 < vAp \tag{3}$$

4. The zoom lens according to claim 1, wherein during zooming, an opening diameter of the aperture stop is variable, and the numerical aperture of the zoom lens is constant throughout an entire zoom range.

5. The zoom lens according to claim 1, wherein a focal length of the zoom lens at the wide angle end is fw, Conditional Expression (4) is satisfied, which is represented by $$-0.1 < |fw|/f2w < 0 \tag{4}$$

6. The zoom lens according to claim 1, wherein a focal length of the lens group, which is disposed adjacent to the lens group having the aperture stop on the reduction side of the lens group having the aperture stop and moves during zooming, is fR, Conditional Expression (5) is satisfied, which is represented by $$-1.2 < fR/fAp < -0.1 \tag{5}$$

7. The zoom lens according to claim 1, wherein a back focal length of the zoom lens on the reduction side at the wide angle end at an air conversion distance is Bfw, and a focal length of the zoom lens at the wide angle end is fw, Conditional Expression (6) is satisfied, which is represented by $$4 < Bfw/|fw| \tag{6}$$

8. The zoom lens according to claim 1, wherein the zoom lens consists of six lens groups, a lens group closest to the magnification side in the zoom lens has a positive refractive power and remains stationary with respect to the reduction side imaging plane during zooming, and a lens group closest to the reduction side in the zoom lens has a positive refractive power and remains stationary with respect to the reduction side imaging plane during zooming.

9. The zoom lens according to claim 1, wherein the second optical system includes, successively in order from a position closest to the reduction side to the magnification side along the optical path, a second A lens group having a positive refractive power, a second B lens group having a positive refractive power, a second C lens group having a negative refractive power, a second D lens group having a positive refractive power, and a second E lens group having a refractive power, and during zooming, the second B lens group, the second C lens group, the second D lens group, and the second E lens group move along an optical axis by changing the distances between the adjacent groups in the optical axis direction, and the second A lens group remains stationary with respect to the reduction side imaging plane.

10. The zoom lens according to claim 1, wherein the first optical system includes a plurality of focus groups on the optical path on the reduction side of a maximum air spacing of the first optical system at the wide angle end, and the plurality of focus groups perform focusing by changing distances between the focus groups in the optical axis direction.

11. The zoom lens according to claim 1, wherein Conditional Expression (1-1) is satisfied, which is represented by $$0.2 < f2w/fAp < 1.8 \tag{1-1}$$

12. The zoom lens according to claim 2, wherein Conditional Expression (2-1) is satisfied, which is represented by $$4.7 < ZAp/|fwk| < 8 \tag{2-1}$$

13. The zoom lens according to claim 3, wherein Conditional Expression (3-1) is satisfied, which is represented by $$70 < vAp < 90 \tag{3-1}$$

14. The zoom lens according to claim 5, wherein Conditional Expression (4-1) is satisfied, which is represented by $$-0.06 < |fw|/f2w < 0 \tag{4-1}$$

15. The zoom lens according to claim 6, wherein Conditional Expression (5-1) is satisfied, which is represented by $$-1 < fR/fAp < -0.2 \tag{5-1}$$

16. The zoom lens according to claim 7, wherein Conditional Expression (6-1) is satisfied, which is represented by $$5 < Bfw/|fwk| < 10 \tag{6-1}$$

17. A projection type display device comprising:

a light valve that outputs an optical image; and the zoom lens according to claim 1, wherein the zoom lens projects the optical image, which is output from the light valve, onto a screen.

18. An imaging apparatus including the zoom lens according to claim 1.

* * * * *